United States Patent
Blume

(10) Patent No.: US 9,291,274 B1
(45) Date of Patent: Mar. 22, 2016

(54) VALVE BODY AND SEAL ASSEMBLY

(71) Applicant: Novatech Holdings Corp., Salt Lake City, UT (US)

(72) Inventor: George H. Blume, Austin, TX (US)

(73) Assignee: Novatech Holdings Corp., Salt Lake City, UT (US)

( * ) Notice: Subject to any disclaimer, the term of this patent is extended or adjusted under 35 U.S.C. 154(b) by 138 days.

(21) Appl. No.: 13/899,112

(22) Filed: May 21, 2013

Related U.S. Application Data

(60) Division of application No. 12/472,399, filed on May 27, 2009, now abandoned, which is a continuation-in-part of application No. 11/567,127, filed on Dec. 5, 2006, now abandoned, which is a continuation-in-part of application No. 11/148,081, filed on Jun. 8, 2005, now Pat. No. 7,168,440, which is a continuation-in-part of application No. 10/179,804, filed on Jun. 25, 2002, now Pat. No. 6,955,181, which is a continuation-in-part of application No. 09/836,043, filed on Apr. 16, 2001, now abandoned.

(51) Int. Cl.
 *F16K 1/42* (2006.01)
 *F16K 1/46* (2006.01)
(52) U.S. Cl.
 CPC ... *F16K 1/42* (2013.01); *F16K 1/46* (2013.01); *Y10T 137/7868* (2015.04)
(58) Field of Classification Search
 CPC .... F16K 1/34–1/385; F16K 1/42; F16K 1/46; Y10T 137/7868
 USPC ............. 251/332–334; 137/516.29, 902
 See application file for complete search history.

(56) References Cited

U.S. PATENT DOCUMENTS

| 1,372,878 A | 3/1921 | Harder |
| 1,526,248 A | 2/1925 | Small |
| 1,705,800 A | 3/1929 | Akeyson |

(Continued)

FOREIGN PATENT DOCUMENTS

| CA | 1140521 A1 | 2/1983 |
| CN | 201487257 U | 5/2010 |

(Continued)

OTHER PUBLICATIONS

Copending U.S. Appl. No. 14/212,369, filed Mar. 14, 2014; Inventor: Roy Michael Butler et al.

(Continued)

*Primary Examiner* — John Bastianelli
(74) *Attorney, Agent, or Firm* — Gardere Wynne Sewell LLP

(57) ABSTRACT

A valve body and seal assembly comprises at least one seal and a valve body that may include a frusto-conical valve body impact area (also referred to as a valve seat contact portion) for sealing against a valve seat. In one embodiment, the at least one seal may comprise a first and second seal sections that comprise first and second elastomers, respectively, and an intra-seal interface where the first seal section may contact the second seal section. The first seal section may comprise a first frusto-conical seal portion, and the second seal section may comprise a second frusto-conical seal portion, each for sealing against the valve seat. A method for making a valve body and seal assembly is also provided. First and second elastomers may be crosslinked. The intra-seal interface may be planar or non-planar (i.e., may comprise, e.g., a cylindrical portion and/or a frusto-conical portion).

18 Claims, 24 Drawing Sheets

(56) References Cited

U.S. PATENT DOCUMENTS

| | | | |
|---|---|---|---|
| 1,716,896 A * | 6/1929 | Miller | 251/175 |
| 1,733,180 A | 10/1929 | Biedermann | |
| 1,964,249 A | 11/1930 | Chase | |
| 1,863,252 A | 6/1932 | Pierce | |
| 2,103,503 A | 12/1937 | White | |
| 2,163,472 A | 6/1939 | Shimer | |
| 2,232,739 A * | 2/1941 | Sharp et al. | 137/533.23 |
| 2,329,576 A * | 9/1943 | Anderson | 137/516.29 |
| 2,435,948 A | 2/1948 | Wischhusen | |
| 2,439,240 A | 4/1948 | Cummings | |
| 2,621,017 A | 12/1952 | Yohpe | |
| 2,627,259 A | 2/1953 | Wood et al. | |
| 2,665,675 A | 1/1954 | Sheppard | |
| 2,675,021 A | 4/1954 | Allin | |
| 2,726,843 A | 12/1955 | Evans et al. | |
| 2,745,631 A * | 5/1956 | Shellman | 251/175 |
| 2,762,601 A * | 9/1956 | Clade | 251/368 |
| 2,903,235 A | 9/1959 | Rodgers et al. | |
| 2,904,065 A | 9/1959 | Butlin | |
| 2,904,385 A | 9/1959 | Charle et al. | |
| 2,949,127 A | 8/1960 | Malina | |
| 3,053,500 A | 9/1962 | Atkinson | |
| 3,054,422 A | 9/1962 | Napolitano | |
| 3,070,120 A | 12/1962 | Wendt | |
| 3,090,596 A | 5/1963 | Gifford | |
| 3,107,895 A | 10/1963 | Vogeli | |
| 3,127,905 A | 4/1964 | Vogeli | |
| 3,164,364 A | 1/1965 | McColl | |
| 3,174,718 A | 3/1965 | Bowen et al. | |
| 3,191,617 A | 6/1965 | Maddox | |
| 3,202,178 A | 8/1965 | Wolfe | |
| 3,426,741 A | 2/1969 | Haagen | |
| 3,433,250 A | 3/1969 | Hagihara | |
| 3,450,385 A | 6/1969 | Paptzun | |
| 3,483,885 A | 12/1969 | Leathers | |
| 3,518,742 A | 7/1970 | Merrill et al. | |
| 3,611,470 A | 10/1971 | Gaston | |
| 3,620,653 A | 11/1971 | Gaylord et al. | |
| 3,742,976 A | 7/1973 | Bailey | |
| 3,759,385 A | 9/1973 | Pouillon | |
| 3,770,009 A | 11/1973 | Miller | |
| 3,874,636 A | 4/1975 | Bake et al. | |
| 3,884,266 A | 5/1975 | Kondo | |
| RE29,299 E | 7/1977 | Estes et al. | |
| 4,076,212 A | 2/1978 | Leman | |
| 4,077,636 A | 3/1978 | Langford | |
| 4,099,706 A | 7/1978 | Steele, Jr. et al. | |
| 4,113,268 A | 9/1978 | Simmons et al. | |
| 4,130,285 A | 12/1978 | Whitaker | |
| 4,140,148 A | 2/1979 | Richter | |
| 4,180,097 A | 12/1979 | Sjoberg | |
| 4,194,527 A | 3/1980 | Schonwald et al. | |
| 4,222,126 A | 9/1980 | Boretos et al. | |
| 4,258,901 A | 3/1981 | Zinnai et al. | |
| 4,307,140 A | 12/1981 | Davis | |
| 4,318,532 A | 3/1982 | Winkler | |
| 4,340,084 A | 7/1982 | Snow | |
| 4,394,003 A | 7/1983 | Whitaker | |
| 4,408,629 A | 10/1983 | Lafont | |
| 4,508,315 A | 4/1985 | Livorsi et al. | |
| 4,518,329 A | 5/1985 | Weaver | |
| 4,529,006 A | 7/1985 | Block et al. | |
| 4,545,404 A | 10/1985 | Redwine | |
| 4,597,367 A | 7/1986 | Hayashi | |
| 4,676,481 A | 6/1987 | Hayes | |
| 4,822,000 A | 4/1989 | Bramblet | |
| 4,822,003 A | 4/1989 | Self | |
| 4,832,769 A | 5/1989 | Shantz et al. | |
| 4,834,036 A | 5/1989 | Nishiyama et al. | |
| 4,842,287 A | 6/1989 | Weeks | |
| 4,860,995 A | 8/1989 | Rogers | |
| 4,876,126 A | 10/1989 | Takemura et al. | |
| 4,915,355 A | 4/1990 | Fort | |
| 4,944,977 A | 7/1990 | Shantz et al. | |
| 4,951,707 A | 8/1990 | Johnson | |
| 5,029,811 A | 7/1991 | Yamamoto et al. | |
| 5,052,435 A | 10/1991 | Crudup et al. | |
| 5,062,452 A | 11/1991 | Johnson | |
| 5,082,020 A | 1/1992 | Bailey et al. | |
| 5,088,521 A | 2/1992 | Johnson | |
| 5,176,170 A | 1/1993 | Boyesen | |
| 5,193,577 A | 3/1993 | de Koning | |
| 5,249,600 A | 10/1993 | Blume | |
| 5,253,987 A | 10/1993 | Harrison | |
| 5,275,204 A | 1/1994 | Rogers et al. | |
| 5,328,763 A | 7/1994 | Terry | |
| 5,345,965 A * | 9/1994 | Blume | 137/533.25 |
| 5,392,826 A | 2/1995 | Saville et al. | |
| 5,431,186 A | 7/1995 | Blume | |
| 5,431,415 A | 7/1995 | Millonig et al. | |
| 5,458,314 A | 10/1995 | Bonesteel | |
| 5,480,163 A | 1/1996 | Miser et al. | |
| 5,535,784 A | 7/1996 | Saville et al. | |
| 5,538,029 A | 7/1996 | Holtgraver | |
| 5,931,474 A | 8/1999 | Chang et al. | |
| 6,026,670 A | 2/2000 | Woulds | |
| 6,189,894 B1 | 2/2001 | Wheeler | |
| 6,206,376 B1 | 3/2001 | Hartman et al. | |
| 6,435,475 B1 | 8/2002 | Blume | |
| 6,679,447 B2 | 1/2004 | Jallot et al. | |
| 6,679,477 B1 | 1/2004 | Blume | |
| 6,679,526 B2 | 1/2004 | Yamamoto et al. | |
| 6,698,719 B2 | 3/2004 | Geiser | |
| 6,955,181 B1 | 10/2005 | Blume | |
| 6,955,339 B1 | 10/2005 | Blume | |
| 7,168,440 B1 | 1/2007 | Blume | |
| 7,222,837 B1 | 5/2007 | Blume | |
| 7,513,483 B1 | 4/2009 | Blume | |
| 7,513,759 B1 | 4/2009 | Blume | |
| 7,591,450 B1 | 9/2009 | Blume | |
| 7,641,175 B1 | 1/2010 | Blume | |
| 8,037,897 B2 | 10/2011 | McIntire | |
| 8,141,849 B1 | 3/2012 | Blume | |
| 8,317,498 B2 | 11/2012 | Gambier et al. | |
| 8,567,753 B1 | 10/2013 | Gilstad et al. | |
| 2013/0020521 A1 | 1/2013 | Byrne | |

FOREIGN PATENT DOCUMENTS

| | | |
|---|---|---|
| CN | 101737317 A | 6/2010 |
| CN | 201786639 U | 4/2011 |
| GB | 2323597 A | 9/1998 |
| JP | 2001227480 A | 8/2001 |

OTHER PUBLICATIONS

Copending U.S. Appl. No. 61/889,892, filed Oct. 11, 2013; Inventor: Roy Michael Butler et al.
Copending U.S. Appl. No. 61/790,570, filed Mar. 15, 2013; Inventor: Roy Michael Butler et al.
Copending U.S. Appl. No. 61/943,285, filed Feb. 21, 2014; Inventor: Roy Michael Butler et al.
International Search Report and Written Opinion of PCT/US2014/028516 dated Aug. 5, 2014.
"Kevlar Wearforce Composites" brochure (date and author unknown).
"Valves & Seats" brochure, Harrisburg, Inc. (1989).
U.S. Appl. No. 14/212,369; Office Action mailed Jun. 11, 2015.

* cited by examiner

Typical Fluid Section

Triplex Fluid Section Housing

Web Seat & Stem Guided Valve Body

Detail "B - B"

Detail "D - D"

Detail "F - F"

VALVE BODY AND SEAL ASSEMBLY

CROSS-REFERENCE TO RELATED APPLICATIONS

This is a divisional patent application of copending U.S. Ser. No. 12/472,399, which was filed May 27, 2009, which was a continuation-in-part (CIP) patent application of U.S. Ser. No. 11/567,127 which was filed Dec. 5, 2006 (abandoned), which was a CIP of U.S. Ser. No. 11/148,081 which was filed Jun. 8, 2005 (now U.S. Pat. No. 7,168,440), which was a CIP of U.S. Ser. No. 10/179,804 which was filed Jun. 25, 2002 (now U.S. Pat. No. 6,955,181) which was a CIP of U.S. Ser. No. 09/836,043 which was filed Apr. 16, 2001 (abandoned).

FIELD OF THE INVENTION

The invention relates generally to valves suitable for rapid open-close cycling with abrasive particulate fluids, as in high pressure pumps used for oil field operations.

BACKGROUND

Engineers typically design high-pressure oil field pumps in two sections; the (proximal) power end and the (distal) fluid end. The power end usually comprises a crankshaft, reduction gears, bearings, connecting rods, crossheads, crosshead extension rods, etc. Commonly used fluid ends usually comprise a pump housing having at least one suction valve, at least one discharge valve, and at least one bore for a plunger or piston, plus high-pressure seals, retainers, etc. FIG. 1 is a cross-sectional schematic view of a typical fluid end showing its connection to a power section by stay rods. A plurality of fluid sections similar to that illustrated in FIG. 1 may be combined in a fluid end, as suggested in the Triplex fluid end housing schematically illustrated in FIG. 2.

Valve terminology varies according to the industry (e.g., pipeline or oil field service) in which the valve is used. In some applications, the term "valve" means just the moving element or valve body. In the application, however, the term "valve" includes not only a valve body but also one or more valve guides to control the motion of the valve body, a valve seat, and a valve spring and spring retainer that tend to hold the valve closed (i.e., with the valve body reversibly sealed against the valve seat). Valve bodies typically comprise guide means such as a crow-foot guide, a lower guide stem and/or a top guide stem for guiding the valve body as it moves between open and closed positions. Additionally, valve bodies typically include at least one seal retention groove for incorporating a peripheral element for sealing against a valve seat.

FIG. 3 schematically illustrates a cross-section of a web valve seat and a stem-guided valve body incorporating an elastomeric seal insert conventionally bonded within a seal retention groove. Conventional web-seat, stem-guided designs were proposed in the past to withstand the high pressures and repetitive impact loading typical of oil field service. Elastomeric seal tearing or cracking, as schematically illustrated in FIG. 3, extrusion of elastomer into the extrusion gap, and excessive wear of lower and/or top valve stem guides are among the common failure modes of these valves. Additional background, particularly on extrusion-related elastomer stress, can be found in U.S. Pat. No. 6,955,181 B1, incorporated herein by reference.

In valves with conventionally bonded elastomeric seal inserts analogous to that schematically illustrated in FIG. 3, elastomeric seal tearing or cracking typically occurs during valve closure. Such seal damage occurs in part because of high residual elastomer stress that develops due to shrinkage of the elastomer as it cures. Since the seal insert is conventionally bonded to the metal walls of the seal retention groove, elastomer near the bond cannot move appreciably when a cast-in-place seal insert shrinks during curing. In contrast, elastomer more distant from the bond is more free to move as it shrinks Thus, a high residual level of stress is established between areas of seal elastomer with different degrees of movement. And this stress is exacerbated when the seal insert strikes the valve seat. By design, this insert-seat contact occurs slightly before the impact area of the valve body strikes the valve seat. As the valve body then continues to advance toward the valve seat, the portion of the peripheral seal in contact with the valve seat is dragged down the face of the valve seat, thus simultaneously increasing seal elastomer stress. This dragging motion is impeded by friction between the peripheral seal and the valve seat, such friction often being increased by particulate matter trapped between the peripheral seal and the valve seat during valve closure. The combination of frictional drag forces, extrusion stress and seal abrasion due to trapped particulates so increases overall seal elastomer stress that it predisposes the peripheral seal to tearing or cracking. At the same time, valve seat wear is also increased.

Excessive valve guide stem wear is another possible failure mode of valves having top-stem-guided valve bodies such as discharge valve body 701 shown in FIGS. 4A and 4B. Such valves are schematically illustrated in copending patent application Ser. No. 11/125,282, which is incorporated herein by reference. FIG. 5 is a partial cross-section schematically illustrating discharge valve body 701 in its closed position (i.e., with elastomeric seal 703 held in symmetrical contact with valve seat 705 by discharge valve spring 707). Note that top guide stem 709 of discharge valve body 701 is aligned in close sliding contact with top valve stem guide 711.

FIG. 6 schematically illustrates how misalignment of top guide stem 709 is possible with excessive wear of top valve stem guide 711. Such excessive wear can occur because discharge valve body 701, including top guide stem 709, is typically made of steel that has been carburized to a hardness of about 60 Rockwell C. In contrast, the wall of top valve stem guide 711, which is shown in FIG. 6 as being formed within discharge bore plug 713, is typically made of mild alloy steel with a hardness of about 30 Rockwell C. Thus the softer wall of stem guide 711 is worn away by sliding contact with the harder guide stem 709. This wear is accelerated by side loads on valve body 701 that result when fluid flowing past the valve body changes its direction of flow into the discharge manifold. Analogous side loads would be present on a suction valve when fluid flowing past the valve body changes its direction of flow into the plunger cavity.

Eventually, top valve stem guide 711 can be worn sufficiently to allow discharge valve leakage due to significant asymmetric contact of elastomeric seal 703 with valve seat 705 as schematically illustrated in FIG. 7. This problem of stem guide wear is typically addressed in practice through use of a replaceable bushing 715 having a modified top valve stem guide 711' (see the schematic illustration in FIG. 8). Bushing 715 is commonly made of a plastic such as urethane, or a wear and corrosion-resistant metal such as bronze. Such bushings require periodic checking and replacement, but these steps may be overlooked by pump mechanics until a valve fails prematurely. Hence, it has been proposed to replace the carburized steel top guide stem 709, as well as peripheral seal 703, with a guide stem and seal comprising one or more relatively resilient and substantially non-metallic materials having a relatively low specific gravity. See, e.g., U.S. Pat. No. 4,860,995 (hereinafter the '995 patent) wherein a plastic or plastic-like insert is described as being distorted sufficiently to engage and then be mechanically locked, or alternatively bonded, (or both mechanically locked and bonded) to the body portion of a valve element (see col 3, lines 54-68 and col 7, lines 39-57).

If preformed seal inserts are to be distorted and mechanically locked to a valve body as in the '995 patent, the valve body requires finish machining to closely match the dimensions of the seals. Manufacturers recognized that this finish machining could be reduced or eliminated if elastomeric seals were cast and cured in place on the valve body (hereinafter "cast-in-place"). But savings in machining costs were often offset in practice by added costs associated with adhesive bonding of the cast-in-place seal inserts to a valve element in an attempt to increase overall valve body integrity (see the '995 patent, col 7, lines 47-50). The added costs of adhesive bonding, including removal of all oil and contaminants, application of a bonding adhesive, and storage of the valve bodies in a low-humidity, dust-free environment while awaiting the casting, bonding, and curing of the seal insert increased the cost of such valves to the point that they were not competitive on price. Further, as shown in FIG. 3, the elastomer of such cast-in-place seal inserts was subject to cracking or tearing where it was adhesively bonded to a peripheral valve body groove.

SUMMARY

The invention extends the service life of valves by incorporating specially formed elastomeric elements such as valve seals and/or guide stem sleeves as described herein. Elastomeric elements as described herein comprise elastomers (e.g., resilient materials having a modulus less than that of mild steel), and may additionally comprise one or more components that impart or enhance a desirable property (e.g., lubricant(s) and/or lubricant element(s) for reducing a coefficient of friction).

Thus, a valve body and seal assembly as described herein comprises at least one elastomeric element. Further, certain valve body and seal assembly embodiments may comprise at least one elastomeric element having at least one lubricant element partially embedded in it and/or at least one lubricant otherwise incorporated in it. A lubricant element, if present, may in turn be cross-linked to one or more elastomeric elements to which it may be adjacent.

A first embodiment of the invention comprises a method of making a valve body and seal assembly. The method comprises providing a longitudinally symmetrical valve body comprising a seal retention groove and a frusto-conical valve body impact area for contacting a valve seat. The method then comprises providing a mold reversibly fitted to the longitudinally symmetrical valve body to facilitate subsequent casting steps. The method further comprises symmetrically casting a first elastomer (e.g., a polyurethane) in the seal retention groove to form a first seal section having a first frusto-conical seal portion for sealing against a valve seat. In connection with this casting step, the frusto-conical valve body impact area is central to and geometrically similar to the first frusto-conical seal portion.

The method further comprises partially curing the first elastomer, followed by symmetrically casting a second elastomer (e.g., a polyurethane) in the seal retention groove to form a second seal section having a second frusto-conical seal portion for sealing against a valve seat. In connection with this casting step, the first frusto-conical seal portion is centrally adjacent to and geometrically similar to said second frusto-conical seal portion. A final step includes crosslinking and curing the first elastomer and the second elastomer to make a valve body and seal assembly. The mold may then be separated from the valve body and seal assembly.

In the above first embodiment, frusto-conical portions of both the first and second symmetrically cast seal sections function by sealing against a valve seat. The first frusto-conical seal portion is centrally adjacent to and geometrically similar to the second frusto-conical seal portion, and the shapes and/or physical properties of the first and second seal sections may differ in a predetermined manner. For example, the first seal section may have a greater modulus than the second seal section to better cushion the impact forces of rapid valve closure. And the coefficient of friction of the first seal section on a valve seat may differ from the coefficient of friction of the second seal section on the same valve seat so as to minimize seal wear. Further, the area(s) of contact between first and second seal sections (collectively, i.e., the intra-seal interface) may be shaped to beneficially distribute the impact forces of rapid valve closure through the seal sections to predetermined portions of the valve body on which the seal sections are cast.

The lubricant element embodiments shown schematically in FIGS. 14A-F significantly reduce the buildup of residual elastomer seal stress during curing (described above with reference to FIG. 3). The invention reduces seal elastomer stress, and thus cracking, in the region near the extrusion gap (see FIG. 3). In the invention embodiments of FIGS. 14A-F, the conventional elastomer-metal bond schematically shown in FIG. 3 is absent. And a lubricant element is present, a portion of the lubricant element being crosslinked to the seal elastomer. Since the lubricant element is typically relatively non-rigid (compared to the metal of the walls of the seal retention groove), such a lubricant element is relatively free to shrink along with the curing seal elastomer to which it is crosslinked. Thus, residual elastomer stress in the cured seal insert is typically lower in the illustrated invention embodiments of FIGS. 14A-F than in conventionally bonded seal inserts. And exacerbation of seal elastomer stress during valve operation is also reduced as a result of relatively lower frictional drag forces arising as a lubricant element slides relatively easily over the valve seat. Further, a lubricant element can function to reduce extrusion stress in seal elastomers.

Lubricant elements comprise at least one commercially-available polymer (e.g., polyamide) and at least one lubricant (e.g., molybdenum disulfide and/or graphite), the polymer being cross-linkable with an elastomeric element when partially embedded therein. A lubricant element typically has a higher modulus of elasticity than the elastomeric element with which it is crosslinked, and such a lubricant element can function as an anti-extrusion device as described herein. Lubricant elements also tend to reduce sliding friction and wear during valve operation. And elastomeric elements allow small displacements of lubricant elements to which they are crosslinked, while substantially maintaining the lubricant elements' friction-reducing, wear-reducing, and/or anti-extrusion functions.

In certain embodiments, the invention addresses both the problem of premature valve failures due to tearing or cracking of an elastomeric cast-in-place seal insert and the problem of excessive wear of valve stem guides. The problem of excessive wear of valve stem guides applies particularly to applications of top-stem-guided valve bodies because of the absence of the stabilizing influence of a lower guide stem. By allowing limited relative movement between a valve body and the elastomers of seal inserts and guide stem sleeves cast-in-place on the valve body, background and dynamic elastomer stresses are reduced. The amount of such limited relative movement (e.g., in a range of about 2% to 4% of elastomer thickness in the direction of movement) is an inverse function of the modulus of elasticity for each elastomer selected and an inverse function of any adhesion between each elastomer and the valve body. Note however that an elastomer's microstructure (and physical properties such as modulus of elasticity, strengths and stiffnesses) may not be fixed but may instead be functions of the stresses to which the elastomer has been exposed (e.g., mechanical, thermal and/or chemical stress). Thus, appropriate choice of elastomer(s), together with moderation of elastomer stress through inhibition of adhesion between elastomer(s) and a valve body on which they are cast-in-place, results in a relatively longer valve service life with relatively stable elastomer properties. This relative elastomer stability is achieved because the limited relative movement of the invention facilitates dispersion of forces acting on a valve body through the elastomer, with consequent reduction of peak contact pressures, dissipation of impact energy, and moderation of dynamic stress (including hysteresis-induced heat buildup) within the elastomer(s).

The invention includes methods of making a valve body and seal assembly, valve body and seal assemblies made by such methods, and valves comprising such valve body and seal assemblies. Elastomeric elements cast-in-place according to the invention experience relatively lower stress due to limited relative movement between the valve body and the elastomer(s). One such method comprises providing a castable elastomer (comprising, for example, urethane) and a valve body on which the elastomer is cast-in-place. The valve body has a longitudinal axis and comprises a seal retention groove spaced apart from the longitudinal axis. The seal retention groove has first and second opposing sides, the opposing sides being separated by a groove width. A top guide stem, if present, extends away from the seal retention groove along the longitudinal axis, and an impact area of the valve body for contacting a valve seat is proximate to (i.e., is relatively close to or intersects) the first opposing side of the seal retention groove. Note that a transition area may be smoothed between the first opposing side of the seal retention groove and an impact area of the valve body to eliminate or reduce stress risers in this area. Note also that there may be one or more circular serrations on the first and/or second opposing sides of the seal retention groove, these serrations being shown offset in the illustrated embodiments.

The above methods include treating the seal retention groove and the top guide stem as described herein to render them adhesion-inhibiting. In one illustrated embodiment, a mold is provided for containing the castable elastomer, the mold comprising a mold shell mated with the valve body. The mold in this embodiment comprises the adhesion-inhibiting seal retention groove and the adhesion-inhibiting top guide stem. The castable elastomer is poured into the mold and cured in the mold, after which the mold shell is removed from the valve body to make a valve body and seal assembly.

In an alternative illustrated embodiment, first and second molds are provided for containing the castable elastomer, the first and second molds comprising, respectively, an adhesion-inhibiting first mold shell mated with the valve body and an adhesion-inhibiting second mold shell mated with the valve body. The first mold is for a cast-in-place elastomeric seal insert in a seal retention groove and comprises the first mold shell and the valve body's adhesion-inhibiting seal retention groove. The second mold is for a cast-in-place elastomeric top guide stem sleeve and comprises the second mold shell and at least a portion of the adhesion-inhibiting top guide stem. First and second castable elastomers (which may be the same or different) are poured into the first and second molds respectively and cured in these molds, after which the first and second mold shells are removed from the valve body to make a valve body and seal assembly. In a modification of this method, the first and second molds are combined into one mold comprising a mold shell mated with the valve body. This combined mold is for both an elastomeric seal insert in a seal retention groove and an elastomeric top guide stem sleeve and comprises both the adhesion-inhibiting seal retention groove and at least a portion of the adhesion-inhibiting top guide stem. A castable elastomer is poured into and cured within the combined mold, after which the mold shell is removed from the valve body to make a valve body and seal assembly.

The above methods for forming elastomeric elements (e.g., seals and sleeves) may comprise additional steps for placement of at least one lubricant element in a mold so that when an elastomer is poured and cured in the mold (i.e., a castable elastomer), a portion of the lubricant element is embedded in the resulting elastomeric element. Lubricant elements comprise at least one commercially-available polymer (e.g., polyamide) and at least one lubricant (e.g., molybdenum disulfide and/or graphite), the polymer being cross-linkable with a cured elastomeric element when embedded therein.

For example, a portion of a circular lubricant element may be embedded proximate to the first opposing groove wall and to the impact area of a valve body. The circular lubricant element may have, for example, a generally washer shape (i.e., resembling a Belleville washer), or a generally frusto-conical or cylindrical shape. A castable elastomer for such applications would be chosen from commercially available elastomers known to crosslink during curing with the lubricant element polymer (e.g., a poly(vinyl-acetate-ethylene) material such as Polymer Products Inc. black compound P-395). Note that such crosslinking generally increases with increasing temperature. Heat may thus be added in one or more steps in the above methods (e.g., during curing of the castable elastomer and/or by preheating the lubricant element).

In another example, at least one cylindrical lubricant element may be incorporated in a mold in a position surrounding at least a portion of a top stem guide elastomeric element in the form of a sleeve. In this application, a portion of the cylindrical lubricant element is crosslinked with the top stem guide sleeve.

In any of the above examples, lubricant elements tend to reduce sliding friction and wear during valve operation, and the elastomeric elements in which the lubricant elements are partially embedded allow small displacements of the lubricant elements while substantially maintaining their friction-reducing and wear-reducing functions. This means, for example, that particulate matter trapped between a lubricant element and a valve seat will have less tendency to abrade or otherwise damage either the seat or the lubricant element. While a lubricant element may thus move relatively small distances with respect to a valve body on which it operates, it remains relatively stable because of the relative stability of the elastomeric element to which it is crosslinked.

For applications herein, relative stability of elastomeric elements with respect to a valve body is addressed in methods of securing an elastomeric seal insert and a top guide stem sleeve on a valve body that comprises a top guide stem and a seal retention groove having first and second opposing sides. One such method comprises providing one or more circular serrations on the first and/or second opposing groove sides and providing a mold for making an elastomeric seal insert and a top guide stem sleeve, the mold comprising the seal retention groove and at least a portion of the top guide stem. Following this one chooses a castable elastomer that will not adhere to the mold, followed by casting and curing the castable elastomer in the mold to make an adhesion-inhibiting elastomeric seal insert and a top guide stem sleeve and secure them on a valve body. The valve body is subsequently separated from the mold. This method may be modified when separate first and second molds are provided for making an elastomeric seal insert in a seal retention groove and an elastomeric top guide stem sleeve respectively, the first mold comprising the seal retention groove and the second mold comprising at least a portion of the top guide stem. The modified method then allows the use of first and second castable elastomers (which may be different) for casting and curing in the first and second molds respectively to make an adhesion-inhibiting elastomeric seal insert and a top guide stem sleeve and secure them on a valve body. The valve body is subsequently separated from the first and second molds. Note that these methods may be modified by additional steps relating to embedding portions of one or more lubricant elements and crosslinking these elements to the elastomer in which they are partially embedded.

Provision for limited relative movement of cast-in-place elastomers in the illustrated embodiments of the invention obviates shortcomings in past designs related to adhesively bonding or otherwise fixing cast-in-place elastomers to a valve body. Such past designs did not allow limited relative elastomer movement in response to localized dynamic compressive, bending and/or shear loads, nor did these designs account for deleterious effects of an increase in background stress as the elastomer cured and shrank away from portions of a valve body to which it was bonded or otherwise fixed. This increased background and dynamic elastomer stress shortened valve service life because it predisposed the elastomer to cracking and tearing.

The provision of adhesion-inhibiting surfaces in molds for cast-in-place elastomeric valve seals results in materially improved seal performance with conventional seal elastomers. For example, although the MDI polyester thermoset urethanes (comprising a monodiphenylethane polymer and about 14-16% of a diisocyanate curative) are well known seal materials, the invention includes new and non-obvious ways to use these materials. Elastomeric valve seal inserts and guide stem sleeves cast-in-place on valve bodies according to the invention differ materially from prior elastomers cast-in-place on valve bodies due to the inhibition of adhesion (including the absence of bonding) between the elastomer and the valve body, resulting in materially lower levels of background and dynamic stress in the cured elastomer. Such stress reduction, which includes reduction of peak contact pressures, with dissipation of impact energy within the elastomer of seal inserts and guide stem sleeves, significantly extends the service life of both the seal inserts and valve stem guides.

Achievement of adhesion inhibition by treating a valve body as described herein during valve manufacture means that a cast-in-place seal insert may experience limited relative movement with respect to the seal retention groove of that valve body. Groove wall serrations, when used to assist in retaining the seal insert in the peripheral groove during its limited relative movement, may be offset as described below to minimize their effects as stress raisers for either the seal retention groove walls or the elastomer of the cast-in-place seal insert. Such serration placement minimizes valve body fatigue failures due to impact loads and bending stress. Further, serrations may be designed so the seal insert elastomer experiences continued effective contact with the serrations on the groove walls notwithstanding the combined effects of elastomer shrinkage during curing and limited relative movement of the seal insert with respect to the serrations during valve operation. Such continued effective contact (i.e., interdigitation) ensures that the seal insert is retained in its peripheral groove without suffering displacement that would materially reduce its service life.

DETAILED DESCRIPTION

Figure 9:
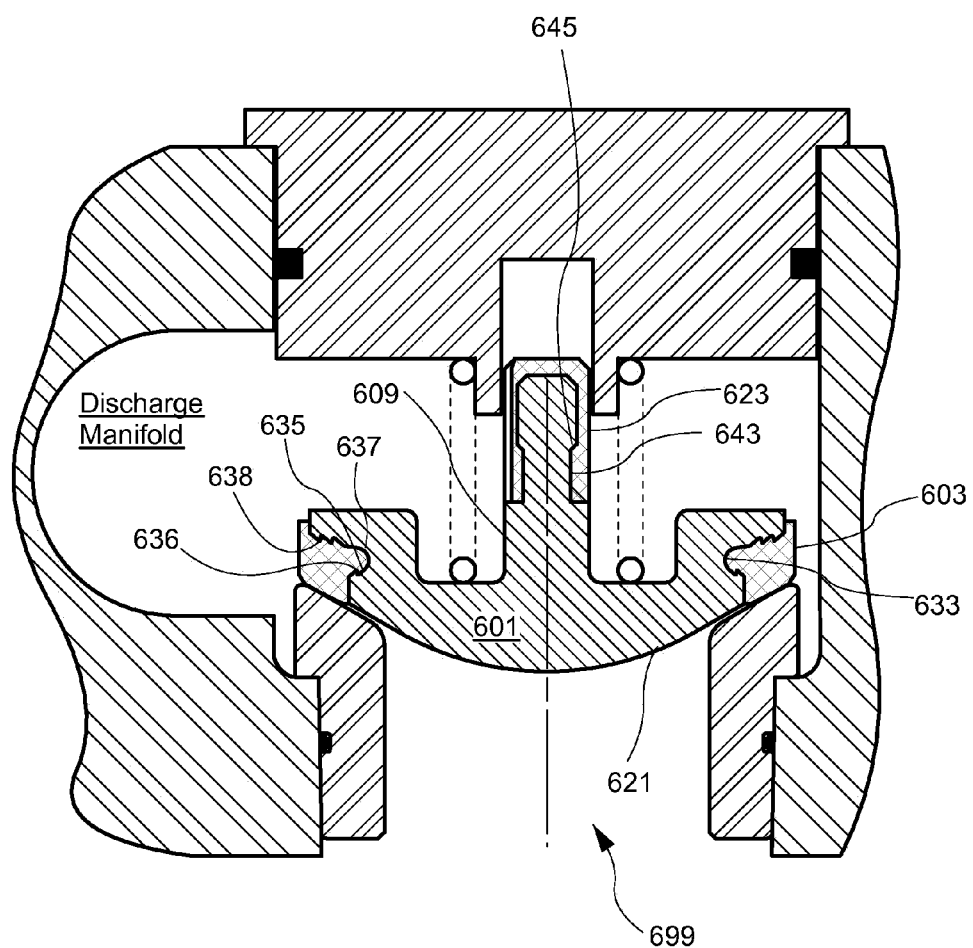
FIG. 9 schematically illustrates an embodiment of a top-stem-guided valve body having a cast-in-place elastomeric seal insert and a separate cast-in-place top guide stem sleeve made according to the invention.
Figure 10:
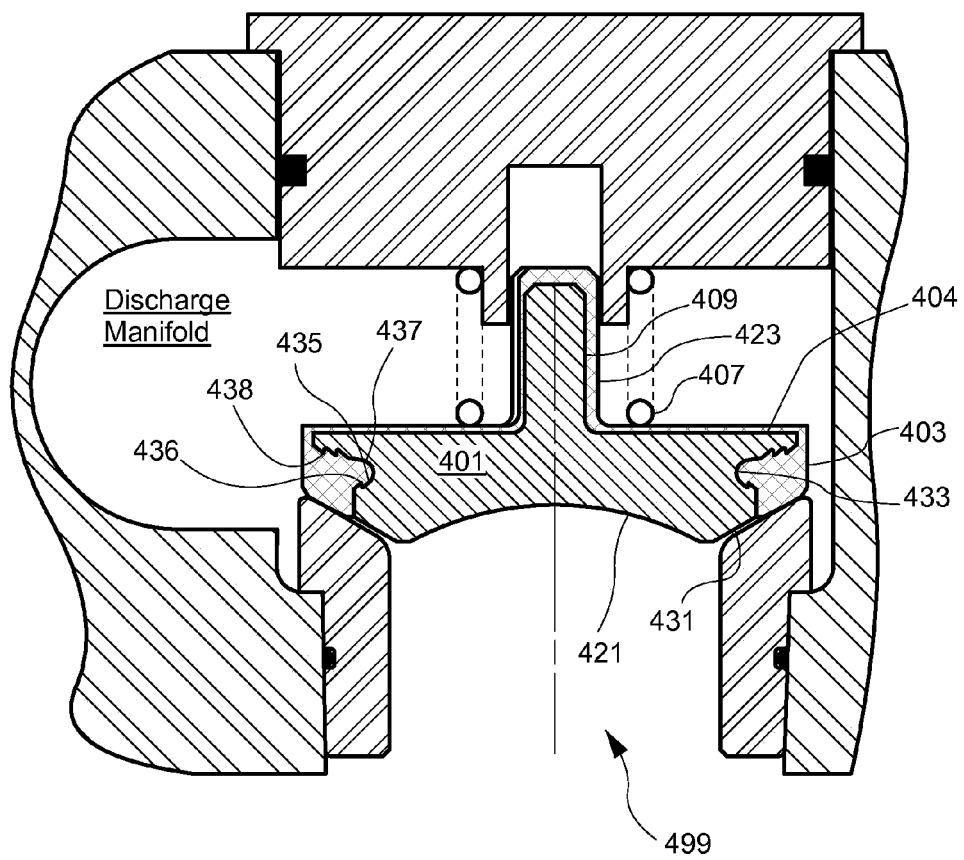
FIG. 10 schematically illustrates an embodiment of a top-stem-guided valve body having a cast-in-place elastomeric seal insert and an integral cast-in-place top guide stem sleeve made according to the invention.

An illustrated embodiment of a top-stem-guided valve body having a cast-in-place elastomeric seal insert and a separate cast-in-place top guide stem sleeve made according to the invention is shown in FIG. 9. The elastomeric seal insert is cast-in-place in a first mold comprising a seal retention groove of a valve body that comprises at least one such groove, while the top guide stem sleeve is cast-in-place in a second mold comprising at least a portion of the top guide stem of the valve body. An illustrated alternative embodiment of a top-stem-guided valve body having a cast-in-place elastomeric seal insert and an integral cast-in-place top guide stem sleeve made according to the invention is shown in FIG. 10. The elastomeric seal insert and the elastomeric top guide stem sleeve are cast-in-place in a single mold comprising both a valve body's seal retention groove and the valve body's top guide stem.

Figure 1:
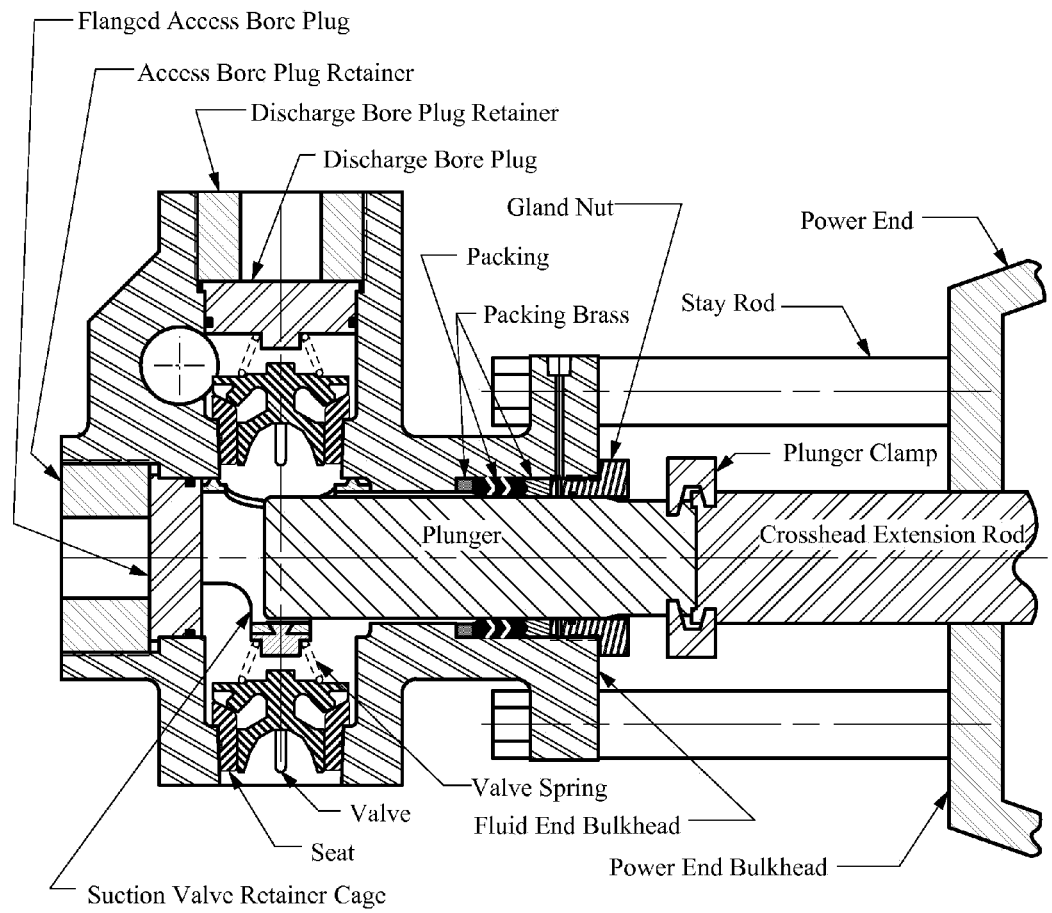
FIG. 1 is a cross-sectional schematic view of a typical plunger pump fluid section showing its connection to a power section by stay rods.
Figure 2:
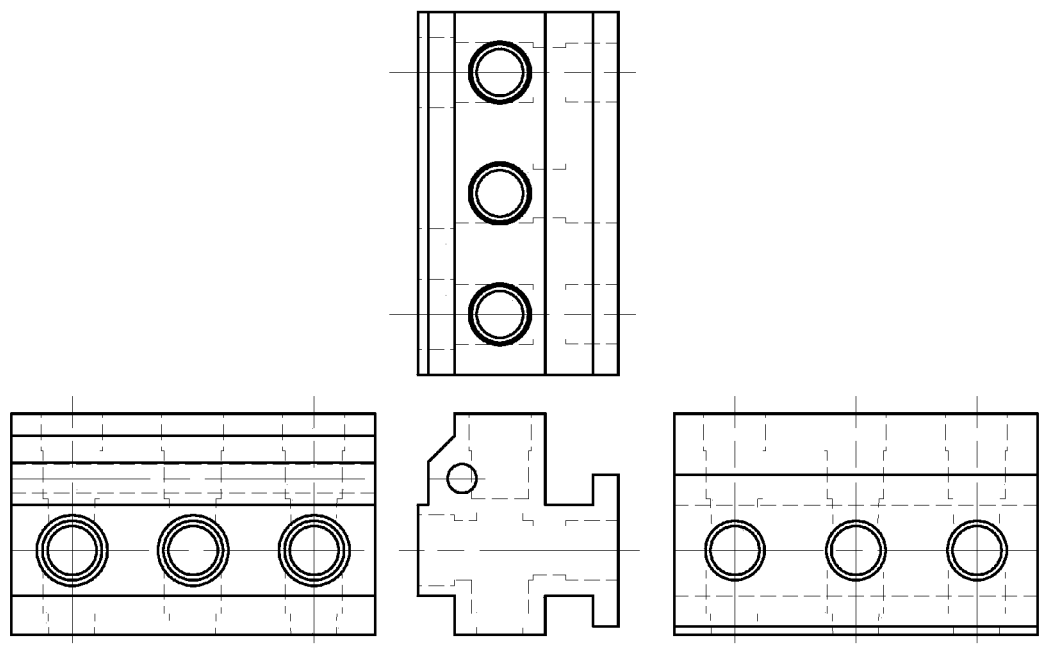
FIG. 2 schematically illustrates a conventional Triplex plunger pump fluid section housing.
Figure 3:
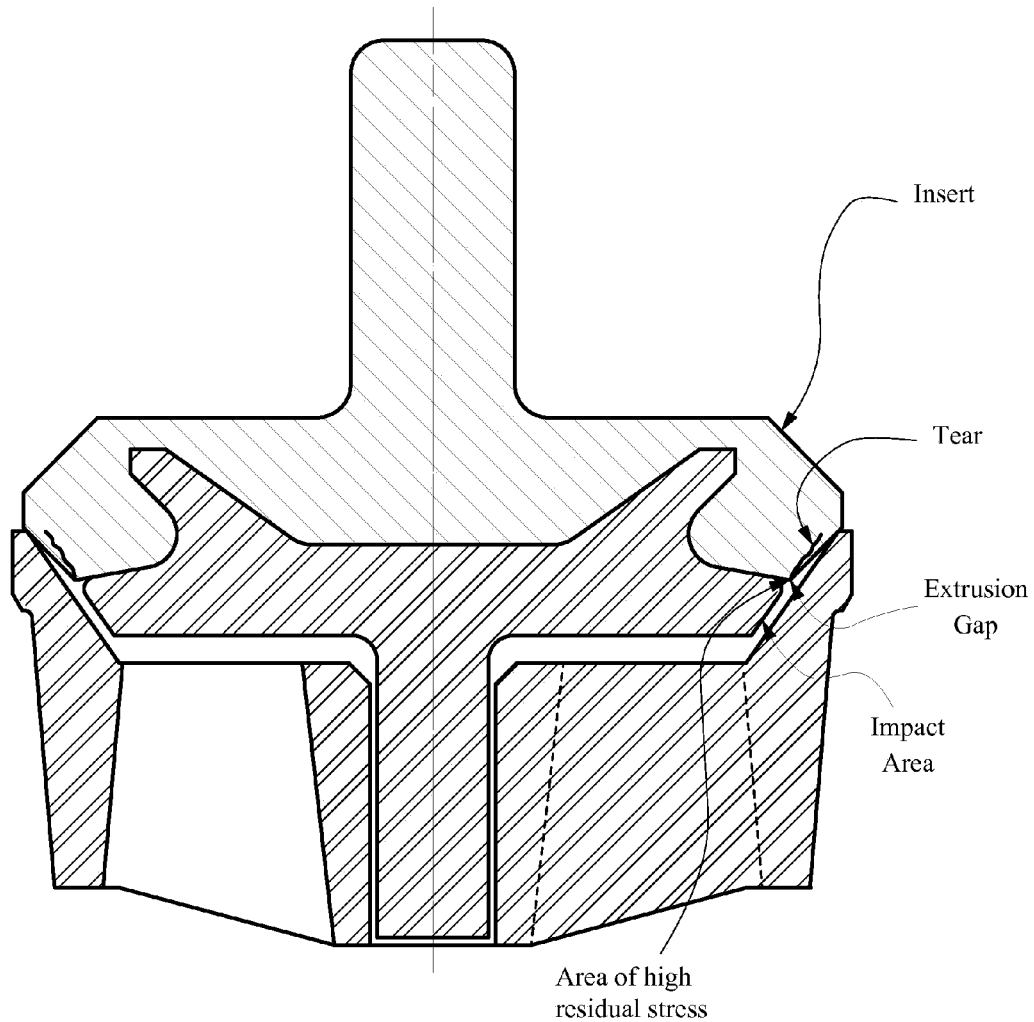
FIG. 3 schematically illustrates a partial cross-section of a web valve seat and a corresponding stem-guided valve body showing areas of common failure modes of cast-in-place elastomeric seals that are bonded to a valve body.
Figure 4A:
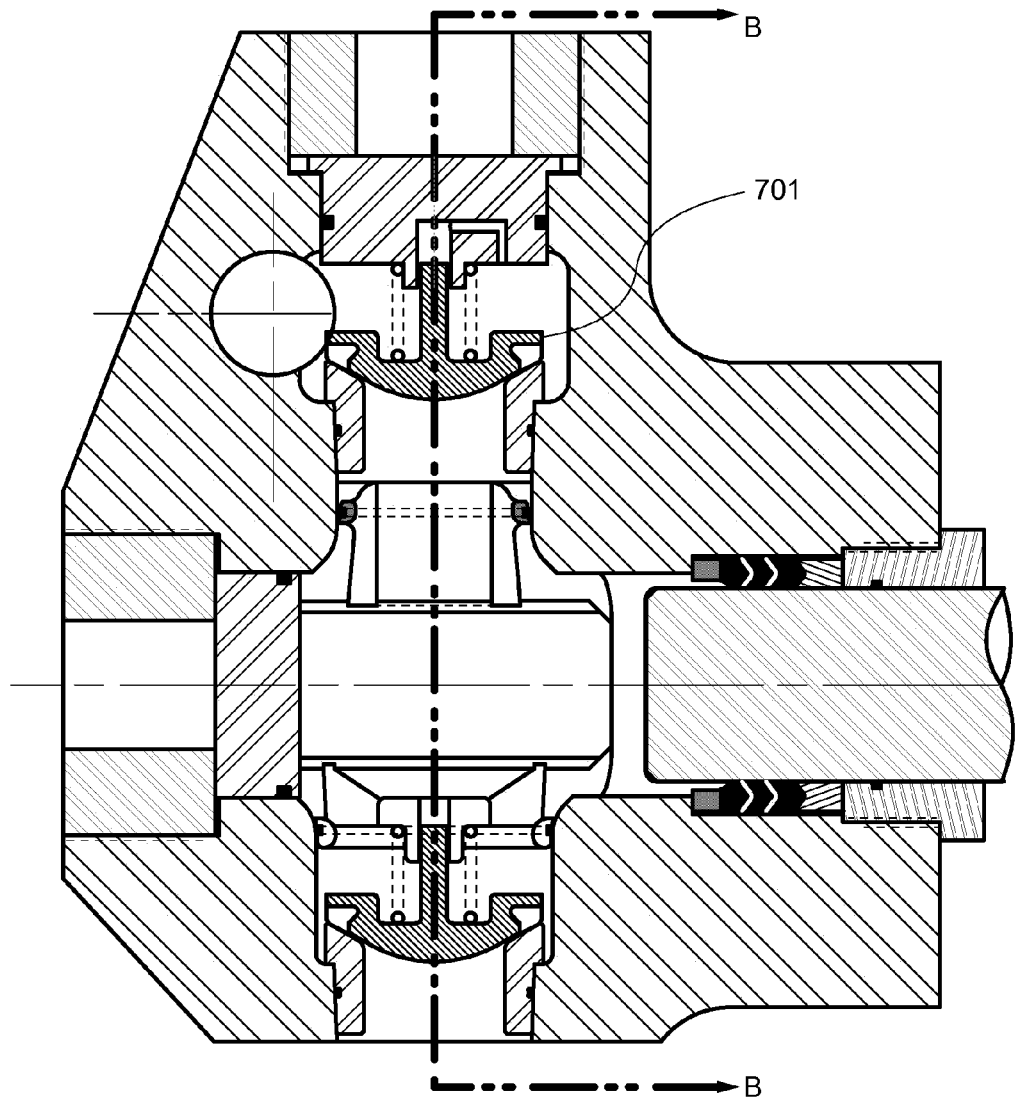
FIG. 4A schematically illustrates a cross-section of a plunger pump that includes a top-stem-guided suction valve and a top-stem-guided discharge valve.
Figure 4B:
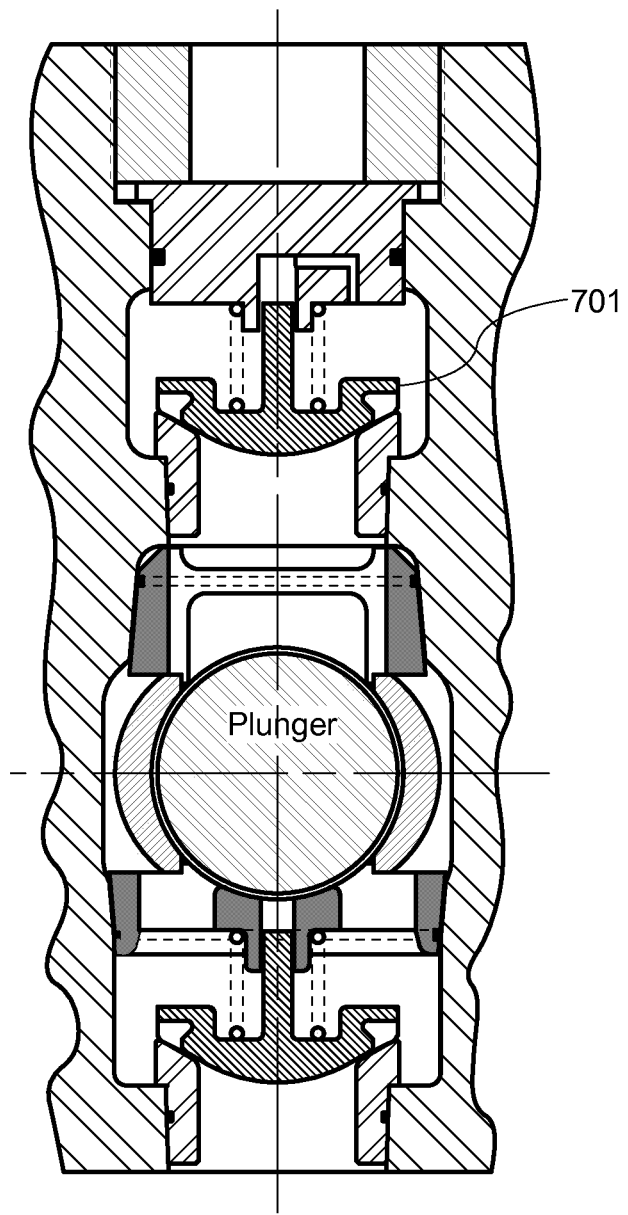
FIG. 4B schematically illustrates the sectional view labeled B-B in FIG. 4A.
Figure 5:
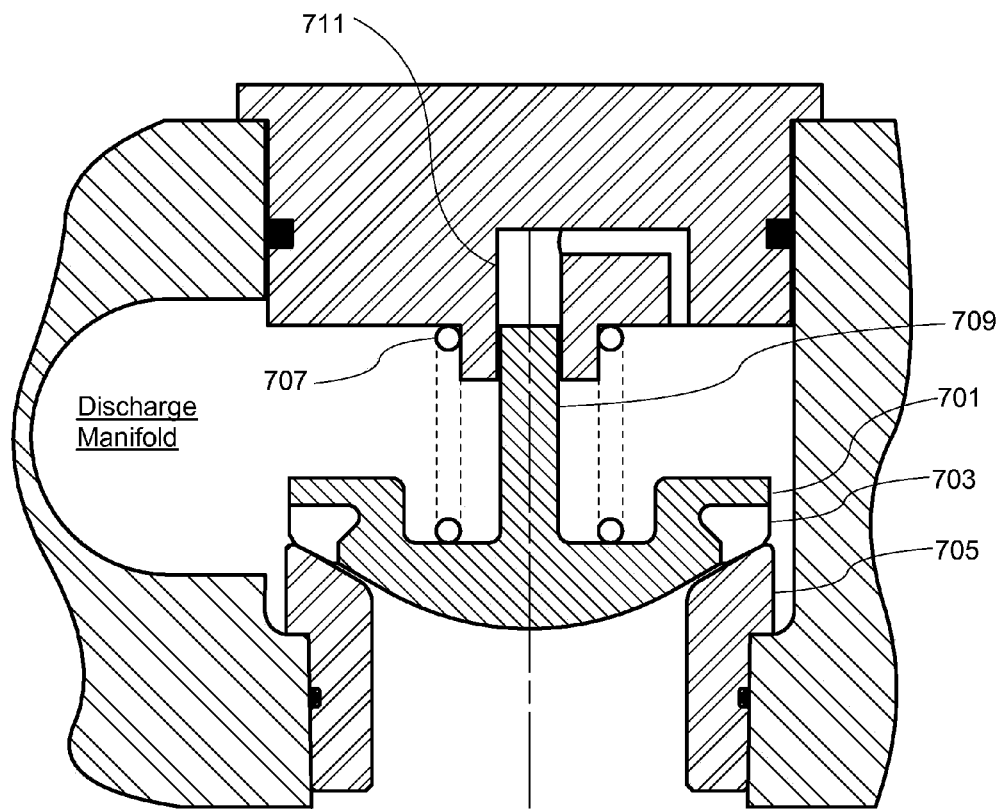
FIG. 5 is a partial cross-section schematically illustrating detail of the top-stem-guided discharge valve of FIGS. 4A and 4B.
Figure 6:
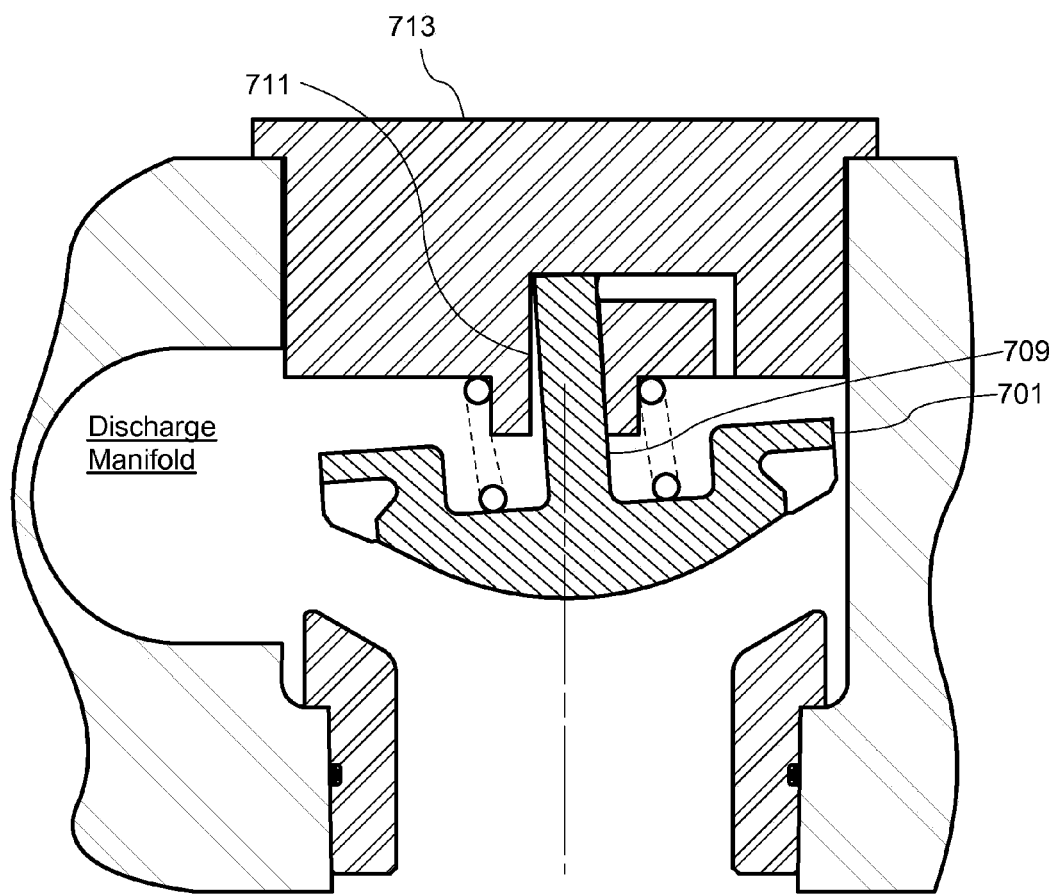
FIG. 6 schematically illustrates misalignment of the top guide stem of the discharge valve of FIG. 5.
Figure 7:
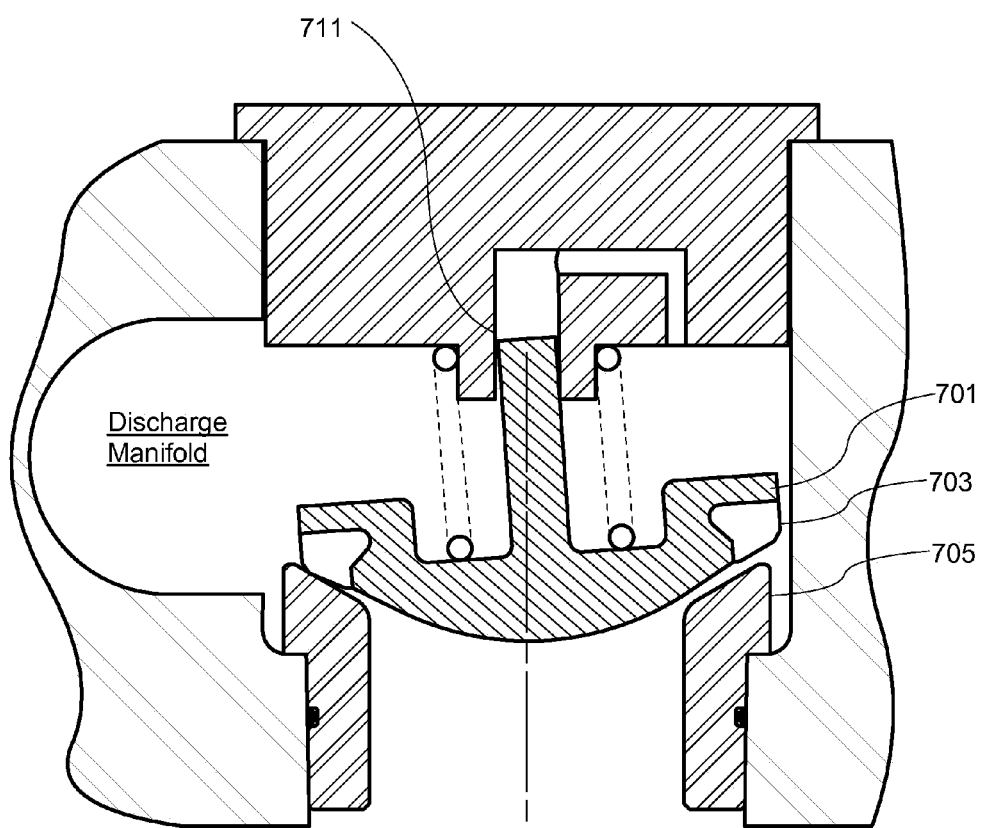
FIG. 7 schematically illustrates improper closure of the discharge valve of FIG. 6 due to misalignment of the top guide stem.
Figure 8:
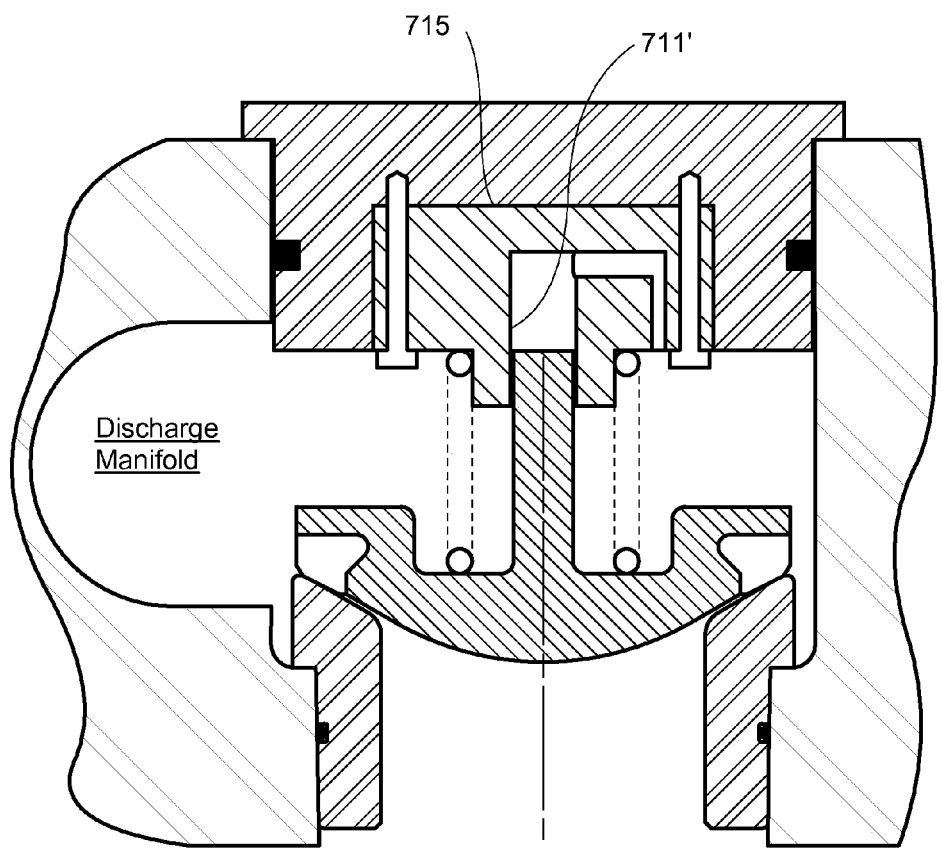
FIG. 8 schematically illustrates a replaceable bushing in a modification of the top valve stem guide shown in FIG. 7.

In making either of the above embodiments, mold surfaces coming into contact with the elastomer as a seal insert and/or a top guide stem sleeve is cast-in-place are chosen and/or prepared so as to inhibit adhesion of the elastomer to each such surface. Adhesion-inhibiting properties of a mold-elastomer interface may be obtained by appropriate choice of materials for the mold and the elastomer, and/or by subsequent treatment of these materials. For example, if a valve body is quenched in oil after heat-treatment (e.g., carburization), a thin layer of the quenching oil may be retained on the seal retention groove after quenching is completed for treating the groove to increase its adhesion-inhibiting properties. An adhesion-inhibiting seal retention groove may also be prepared, for example, by polishing the groove and/or by the applying to the groove one or more layers of non-stick materials such as oils, greases, waxes or plastics having non-stick properties analogous to those of Teflon®. In each case, according to the invention, an elastomeric seal cast-in-place in contact with a mold having adhesion-inhibiting surfaces exhibits minimal or no adherence to such surfaces during curing. That is, forces due to adhesion of the elastomer to mold surfaces, if present, will not materially add to the elastomer's background stress and thus will not materially reduce service life through a mechanism similar to that schematically illustrated in FIG. 3.

The embodiment of a valve body and seal assembly 699 that is schematically illustrated in FIG. 9 comprises a top-stem-guided valve body 601 having a cast-in-place elastomeric seal insert 603 and a separate cast-in-place top guide stem sleeve 623 secured to valve body 601 according to a method of the invention. Elastomeric seal insert 603 is cast-in-place in a seal retention groove 633 having first and second opposing groove sides 635 and 637 respectively, while guide stem sleeve 623 is cast-in-place on top guide stem 609. Note that the illustrated embodiment of top guide stem 609 comprises an undercut 643 having a chamfered superior wall 645 for further securing guide stem sleeve 623 to top guide stem 609 while allowing limited relative movement of guide stem sleeve 623 with respect to top guide stem 609. Guide stem sleeve 623 is additionally secured to top guide stem 609 by an ambient pressure greater than zero because the close fit of guide stem sleeve 623 on top guide stem 609 does not admit air or liquid between them.

Figure 11:
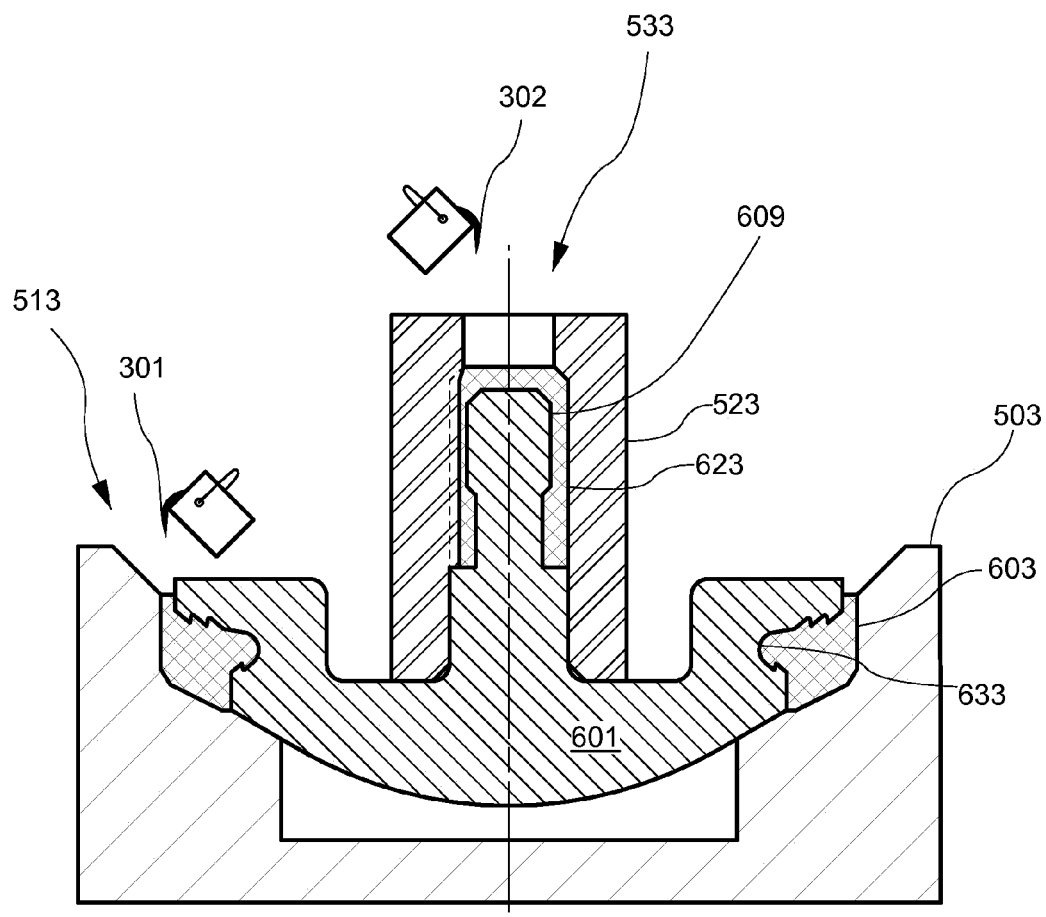
FIG. 11 schematically illustrates a cross-section showing a top-stem-guided valve body and a first mold shell for casting-in-place an elastomeric seal insert in the valve body's seal retention groove, together with a second mold shell for casting-in-place a sleeve on the valve body's top guide stem, the seal retention groove, the top guide stem, and the first and second mold shells comprising adhesion-inhibiting surfaces.

The method of securing an elastomeric seal insert 603 and a top guide stem sleeve 623 on valve body 601 of the illustrated embodiment comprises providing circular serrations 636 on first opposing groove side 635 and circular serrations 638 on second opposing groove side 637. FIG. 11 schematically shows that a first mold 513 is provided comprising the seal retention groove 633, and a second mold 533 is provided comprising at least a portion of the top guide stem 609. At least one castable elastomer is chosen that will not adhere to first mold 513 or second mold 533. In the illustrated embodiment of FIG. 11, castable elastomer 301 is cast and cured in first mold 513 to secure elastomeric seal insert 603 on valve body 601, while a different castable elastomer 302 is cast and cured in second mold 533 to secure top guide stem sleeve 623 on valve body 601. Valve body 601 is then separated from first mold 513 and second mold 533. Note that castable elastomer 301 may be chosen to have one or more properties (e.g., greater compliance) different from those of castable elastomer 302 because of the different stresses to which peripheral seal inserts and guide stem sleeves are exposed in use.

Figure 12:
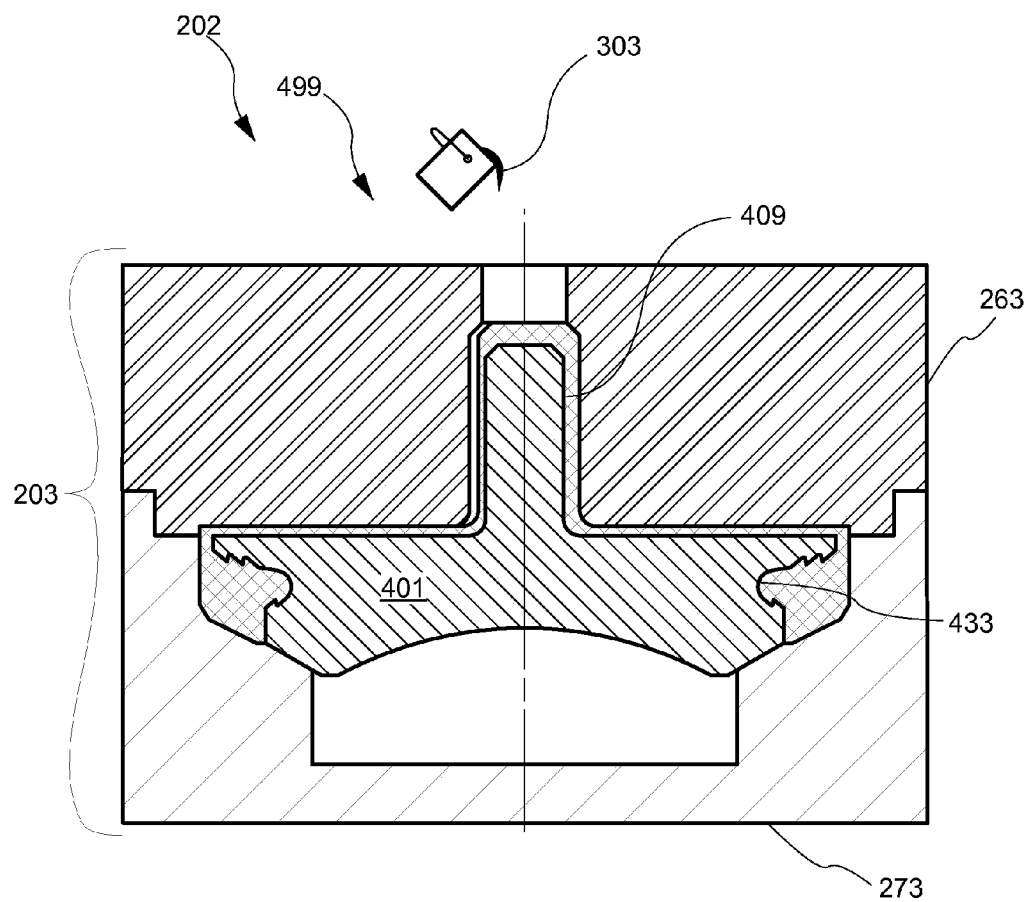
FIG. 12 schematically illustrates a cross-section showing a top-stem-guided valve body and a mold shell for casting-in-place an elastomeric seal insert in the valve body's seal retention groove and an integral sleeve on the valve body's top guide stem, the seal retention groove, the top guide stem, and the mold shell comprising adhesion-inhibiting surfaces.

A cast-in-place elastomer seal insert 603 and guide stem sleeve 623 secured to a valve body 601 as described above experience relatively lower stress due to limited relative movement between the valve body 601 and the elastomer(s) in use. An alternative method of making a valve body and seal assembly 499 (see FIG. 10) comprises providing a castable elastomer 303 (see FIG. 12) and a valve body 401 on which the elastomer is cast-in-place. The valve body 401 has a longitudinal axis and comprises a seal retention groove 433 spaced apart from the longitudinal axis. Note that valve body 401 comprises a partially concave lower surface 421, in contrast to the convex lower surface 621 of valve body 601 (see FIG. 9). Concave lower surface 421 facilitates reducing the mass of valve body 401 without significant loss of valve body strength.

Referring to FIG. 10, seal retention groove 433 has first and second opposing sides 435 and 437 respectively, opposing sides 435 and 437 being separated by a groove width. A top guide stem 409 extends away from seal retention groove 433 along the longitudinal axis, and an impact area 431 of the valve body for contacting a valve seat is proximate to the first opposing side 435 of the seal retention groove 433. There are circular serrations 436 on first opposing side 435 and circular serrations 438 on second opposing side 437 of seal retention groove 433. The method includes treating seal retention groove 433 and top stem guide 409 to render seal retention groove 433 and top guide stem 409 adhesion-inhibiting. Optionally, treating top surface 404 of valve body 401 to render it adhesion-inhibiting may be included in the method, but such treatment may be eliminated because elastomer overlying top surface 404 is locally compressed by valve spring 407. A mold 202 is provided for containing castable elastomer 303, mold 202 comprising mold shell 203 (shown in FIG. 12 as comprising upper mold shell section 263 and lower mold shell section 273) mated with valve body 401. The mold 202 comprises the adhesion-inhibiting seal retention groove 433 and the adhesion-inhibiting top guide stem 409 for making a valve body and seal assembly having an elastomeric seal insert 403 in a seal retention groove integral with an elastomeric top guide stem sleeve 423 on a top guide stem. Castable elastomer 303 is poured into mold 202 and cured in mold 202 to achieve a cross-linked elastomer, after which mold shell 203 is removed to make a valve body and seal assembly 499.

Note that in alternative embodiments, mold 202 can be replaced by two separate molds such as mold 513 and mold 533 (see FIG. 11) for making a valve body and seal assembly having an elastomeric seal insert in a seal retention groove separate from an elastomeric top guide stem sleeve on a top guide stem. FIG. 11 shows that mold 513 comprises mold shell 503 and adhesion-inhibiting seal retention groove 633, while mold 533 comprises mold shell 523 and at least a portion of adhesion-inhibiting top guide stem 609. Castable elastomer 301 is poured into mold 513 and cured in mold 513 to achieve a cross-linked elastomeric seal insert, and castable elastomer 302 is poured into mold 533 and cured in mold 533 to achieve a cross-linked elastomeric top guide stem sleeve. Then mold shell 503 and mold shell 523 are removed to make a valve body and seal assembly 699.

Figure 13A:
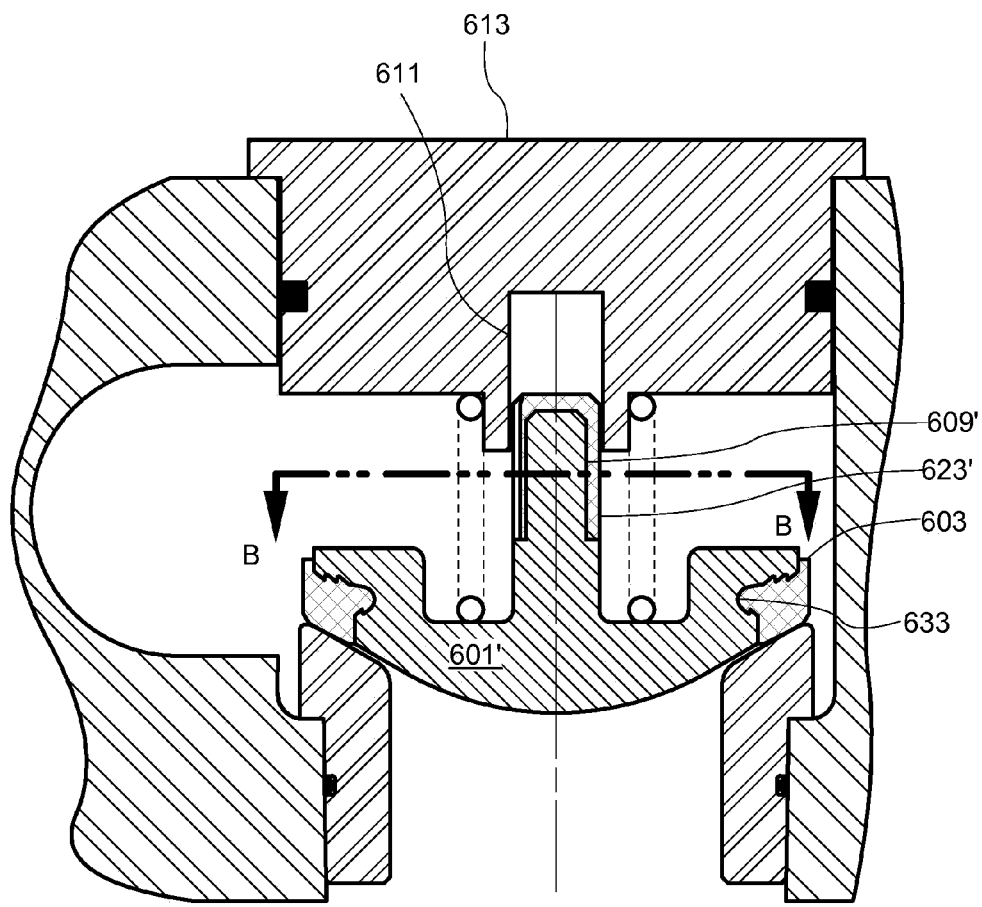
FIG. 13A schematically illustrates a partial cross-section showing detail of a top-stem-guided discharge valve body in a plunger pump, the valve body having a cast-in-place elastomeric seal insert in a seal retention groove and a cast-in-place sleeve on the top guide stem.
Figure 13B:
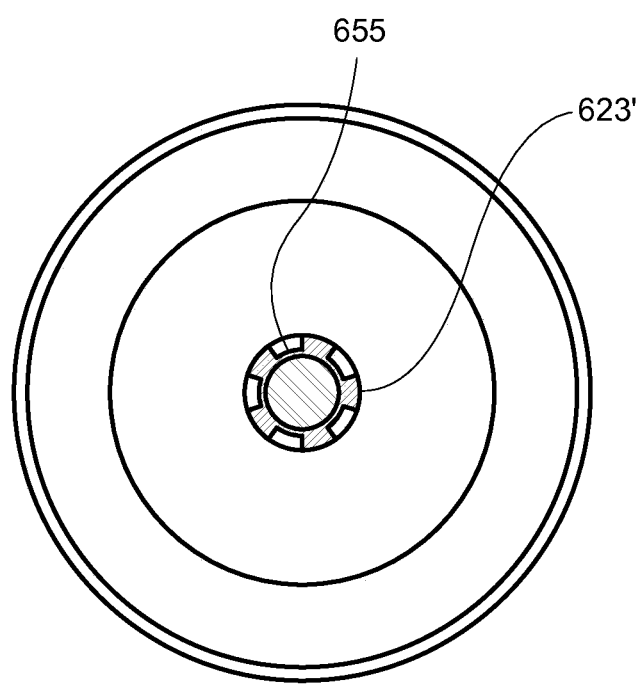
FIG. 13B schematically illustrates the partial cross-section B-B indicated in FIG. 13A, cross-section B-B showing longitudinal fluid flow channels in the top guide stem sleeve.

FIG. 13A schematically illustrates a partial cross-section showing detail of a top-stem-guided discharge valve body 601' in a plunger pump. Valve body 601' has a cast-in-place elastomeric seal insert 603 in a seal retention groove 633 and a cast-in-place sleeve 623' on the top guide stem 609'. Note that top guide stem 609 (see FIG. 9) comprises an undercut 643, whereas top guide stem 609' in FIG. 13 has no undercut. Cast-in-place sleeve 623' is secured on top guide stem 609' by ambient pressure greater than zero as described above. FIG. 13B schematically illustrates the partial cross-section B-B indicated in FIG. 13A, cross-section B-B showing longitudinal fluid flow channels 655 molded into top guide stem sleeve 623'. At least one longitudinal fluid flow channel 655 allows escape of fluid that may be present in top stem guide 611 as top guide stem 609' within top guide stem sleeve 623' advances into top stem guide 611 within discharge bore plug 613. Note that longitudinal fluid flow channels need not be straight as schematically illustrated herein, but may instead have a curved (e.g., spiral or helical) shape, as long as the channel(s) allow longitudinal fluid flow (i.e., the escape of fluid from the top stem guide as described above).

Figure 14A:
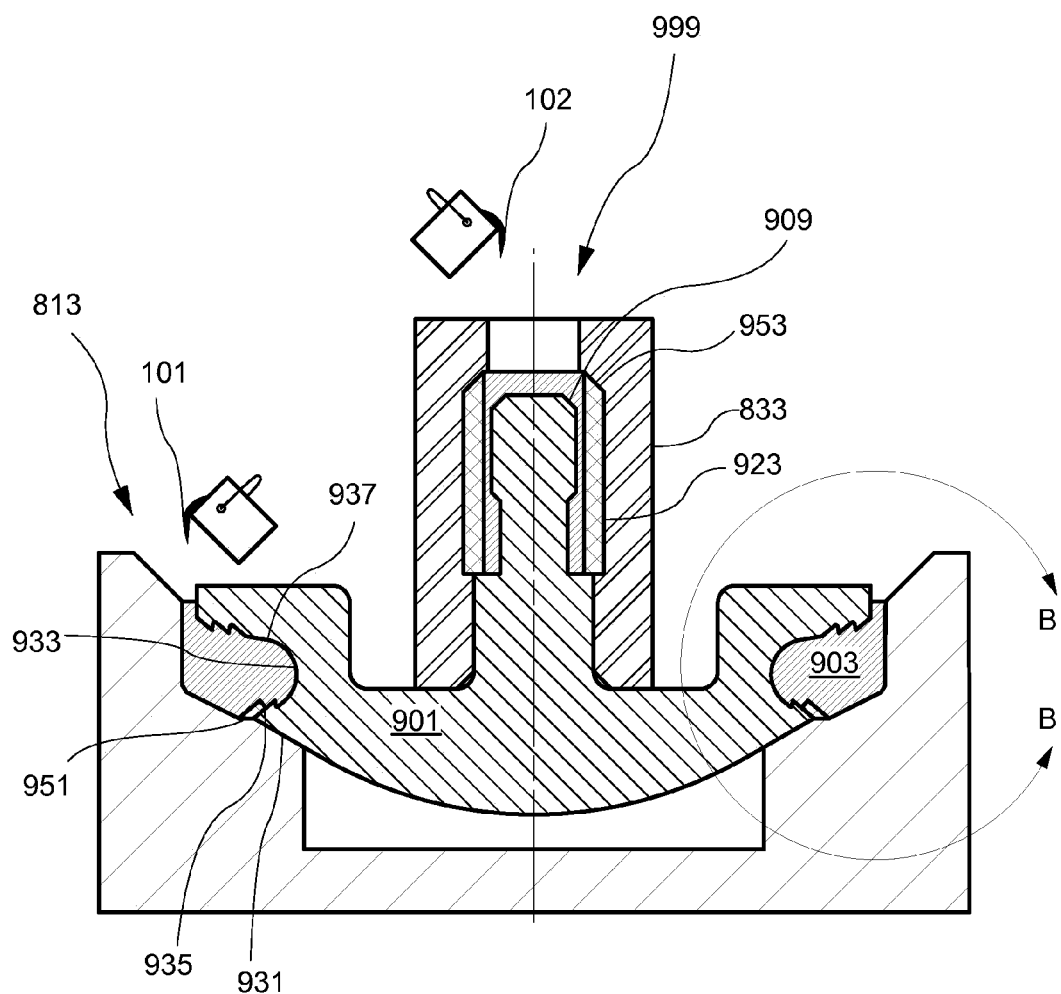
FIG. 14A schematically illustrates a partial cross-section of a valve body and seal assembly 999, together with first and second molds.

FIG. 14A schematically illustrates a partial cross-section of a valve body and seal assembly 999, together with first mold 813 and second mold 833. First mold 813 comprises seal retention groove 933 having first and second opposing sides (i.e., groove walls) 935 and 937 respectively. First opposing groove wall 935 is proximate to valve body impact area 931 of valve body 901. Second mold 833 comprises at least a portion of top guide stem 909 (an embodiment of guide means) of valve body and seal assembly 999. Surfaces of molds 813 and 833 that are intended to contact castable elastomers are adhesion-inhibiting surfaces. Castable elastomers 101 and 102 shown being poured into molds 813 and 833 respectively may be the same or different. Such castable elastomers may be chosen from commercially available elastomers capable of crosslinking with a polymer component of the respective lubricant element 951, 953, 955 and/or 957 intended to be partially embedded in them when cured.

Figure 14B:
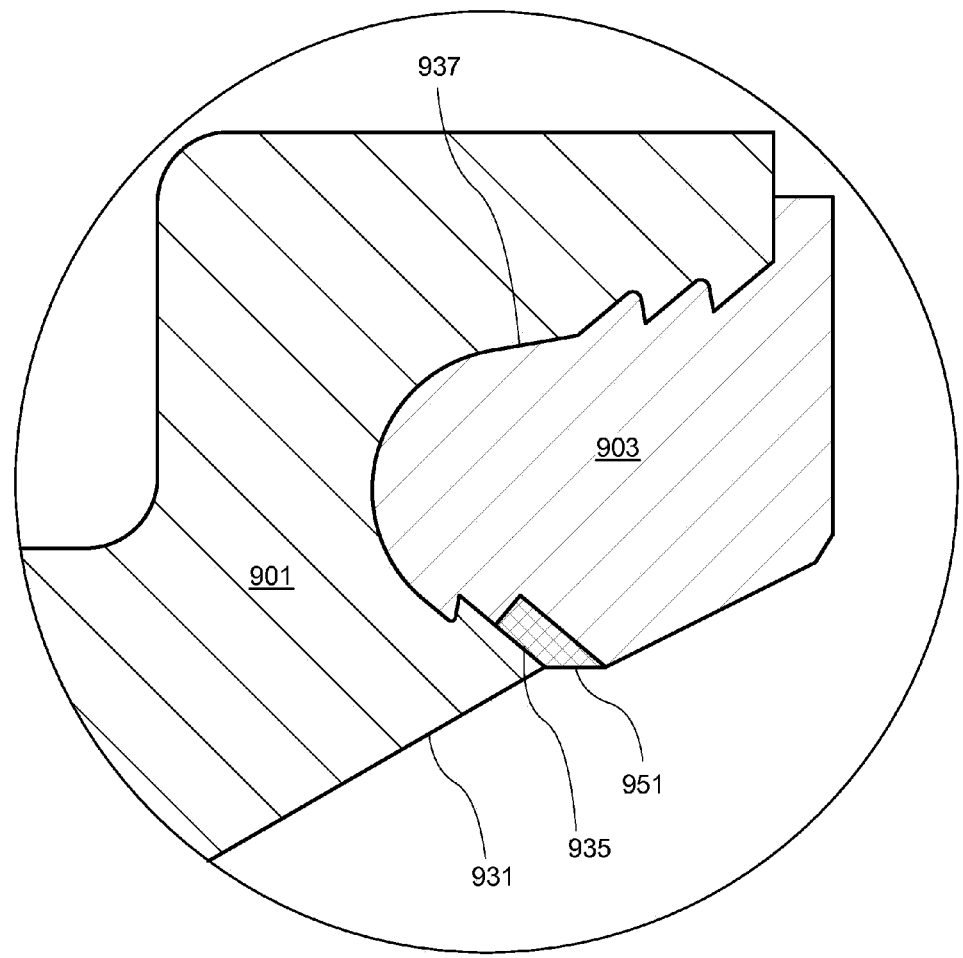
FIG. 14B schematically illustrates a magnified section of the circular lubricant element shown in FIG. 14A which has a generally frusto-conical shape and which is partially embedded in an elastomeric element.
Figure 14C:
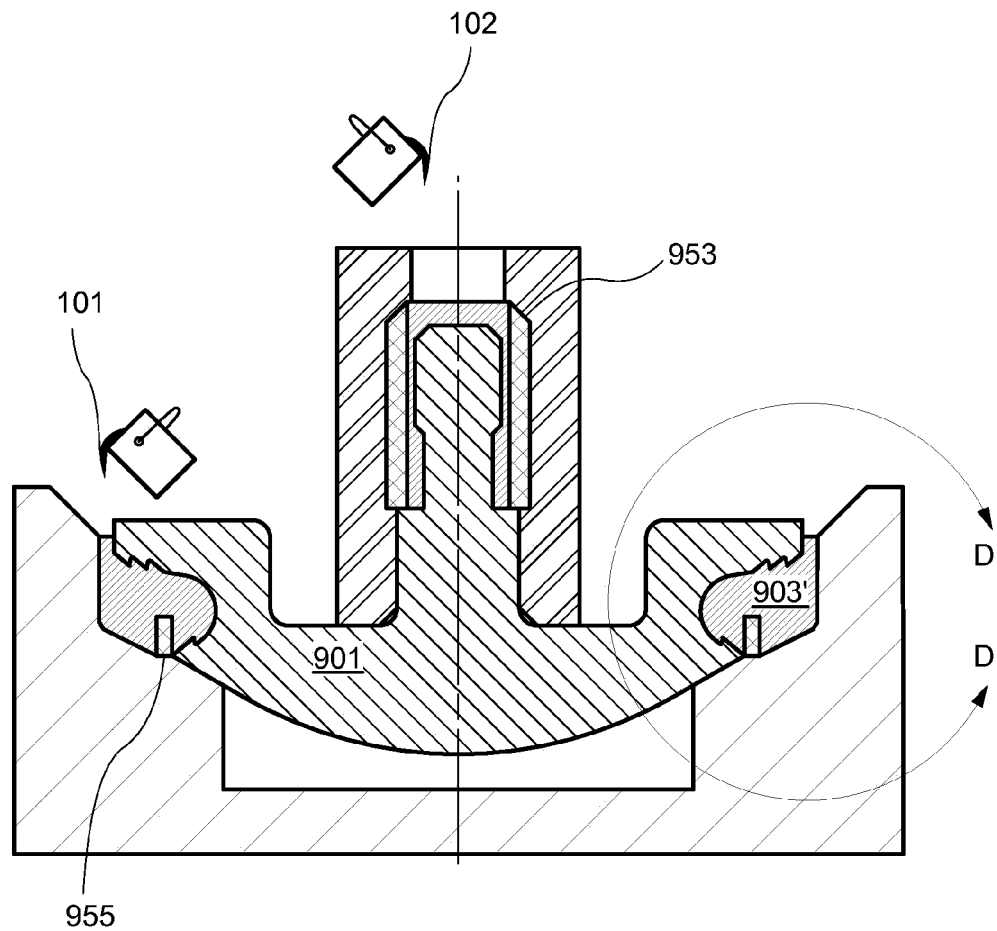
FIG. 14C schematically illustrates a circular lubricant element having a generally cylindrical shape which is partially embedded in an elastomeric element.
Figure 14D:
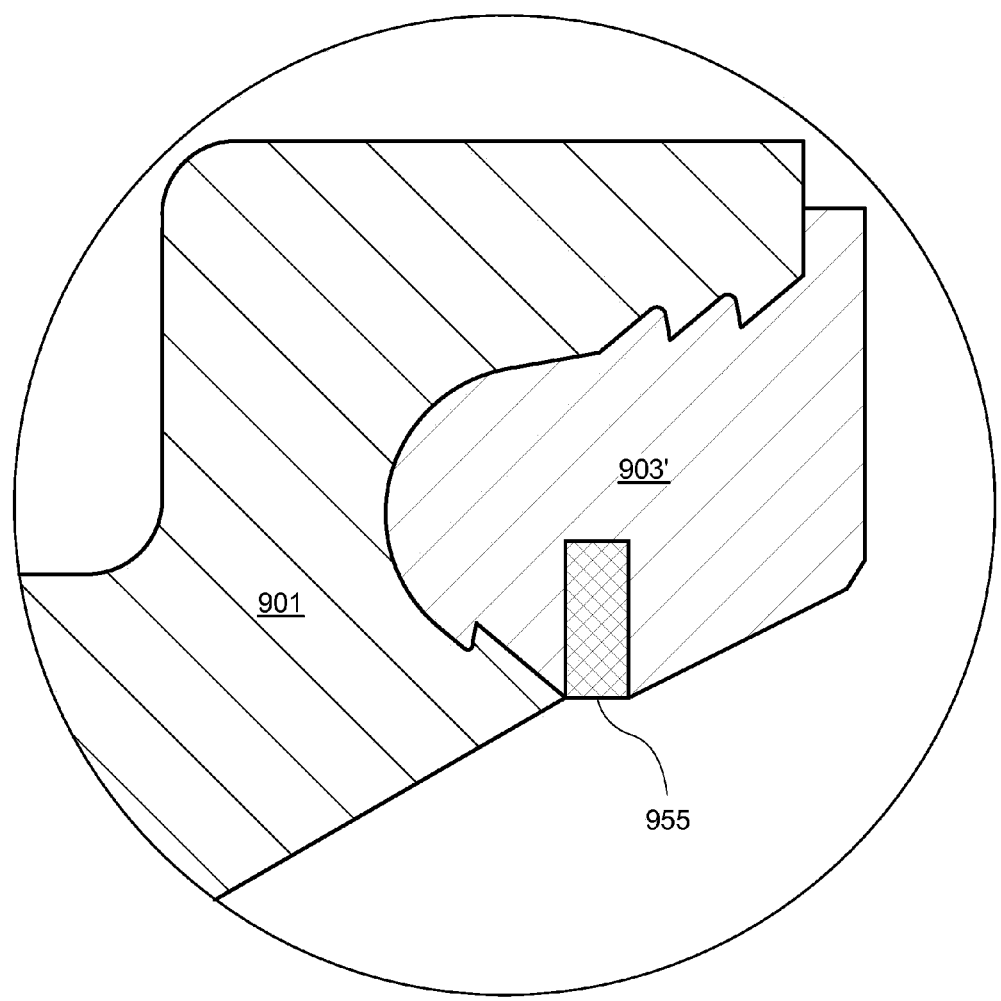
FIG. 14D schematically illustrates a magnified section of the circular lubricant element having a generally cylindrical shape which is shown in FIG. 14C.
Figure 14E:
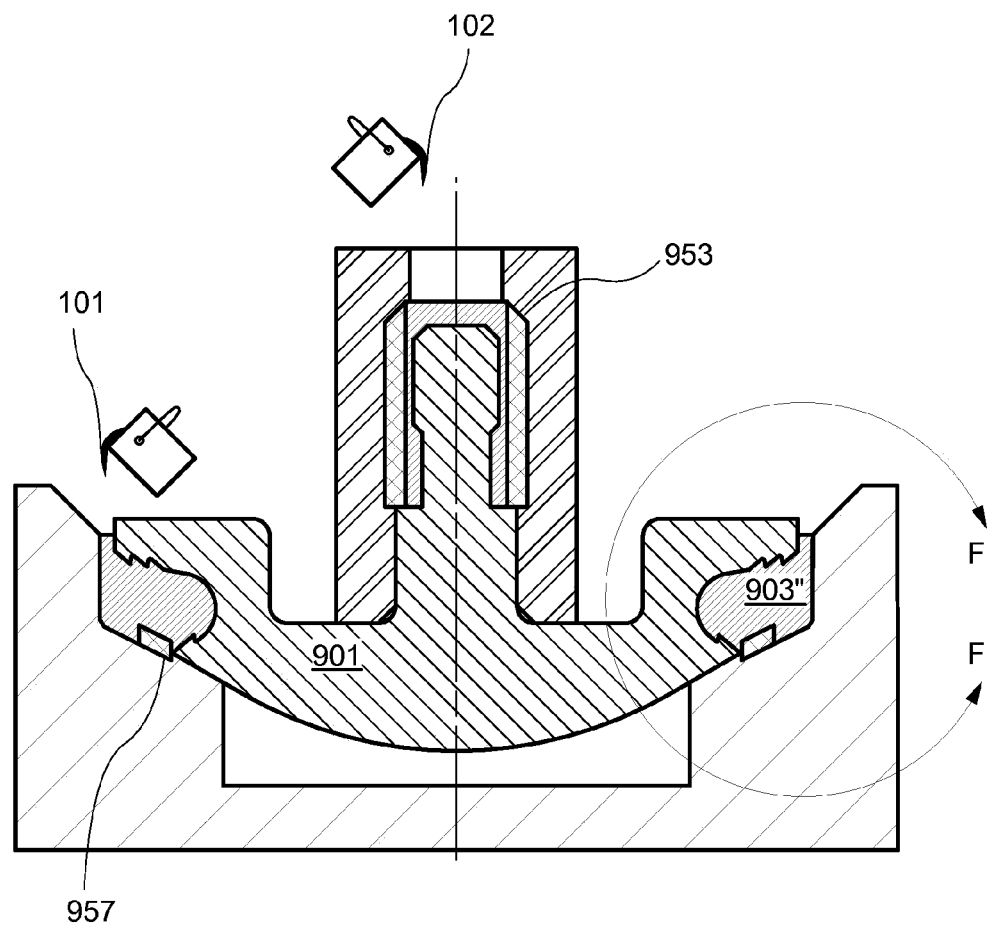
FIG. 14E schematically illustrates a generally washer-shaped circular lubricant element which is partially embedded in an elastomeric element.
Figure 14F:
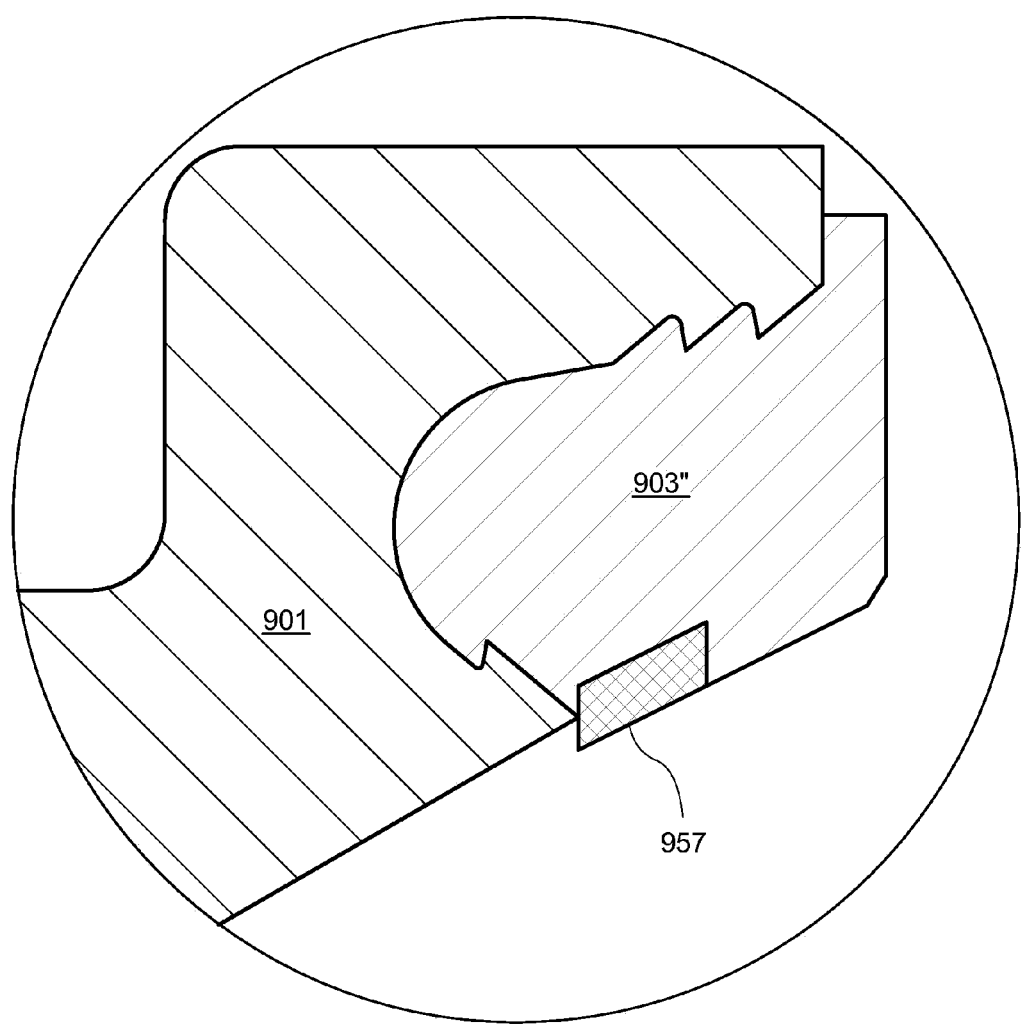
FIG. 14F schematically illustrates a magnified section of the generally washer-shaped circular lubricant element which is shown in FIG. 14E.

Lubricant element 951, shown in schematic cross-section in FIG. 14A and in a magnified section in FIG. 14B, is a circular lubricant element having a generally frusto-conical shape which is partially embedded in elastomeric element 903. Lubricant element 953, also shown in schematic cross-section in FIG. 14A, is a circular lubricant element having a generally cylindrical shape and functioning as a portion of guide stem sleeve 923. Lubricant element 955, shown in schematic cross-section in FIG. 14C and in a magnified section in FIG. 14D, is a circular lubricant element having a generally cylindrical shape which is partially embedded in elastomeric element 903'. Lubricant element 957, shown in schematic cross-section in FIG. 14E and in a magnified section in FIG. 14F, is a generally washer-shaped circular lubricant element which is partially embedded in elastomeric element 903".

Figure 15:
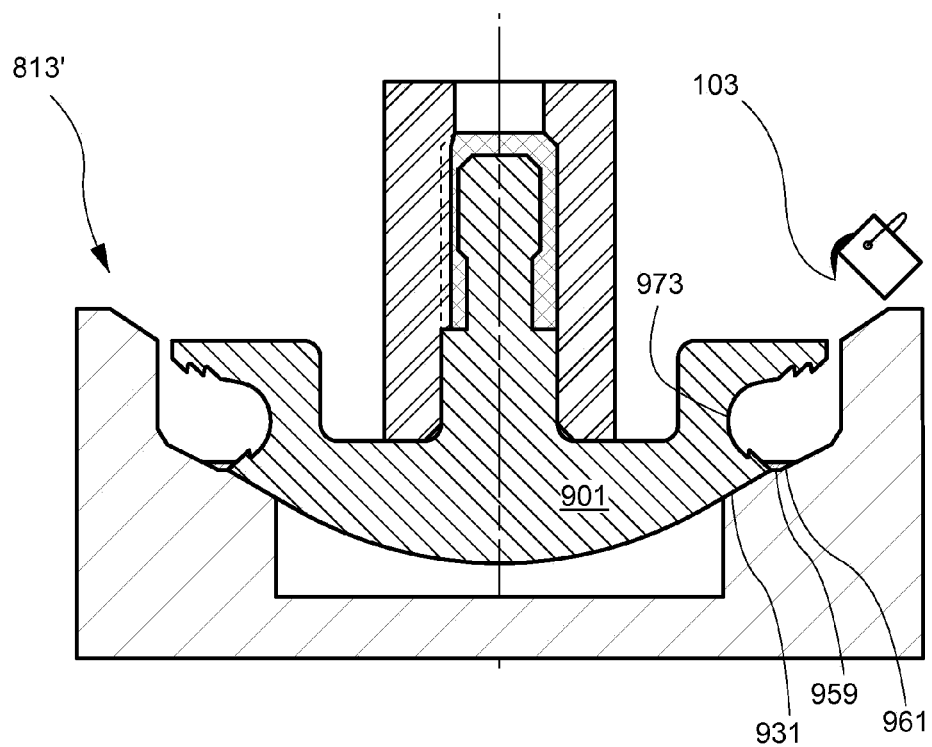
FIG. 15 schematically illustrates a partial cross-section of a valve body and seal assembly 999' analogous-in-part to that shown in FIG. 14A but showing casting of a first seal section in a seal retention groove.
Figure 16:
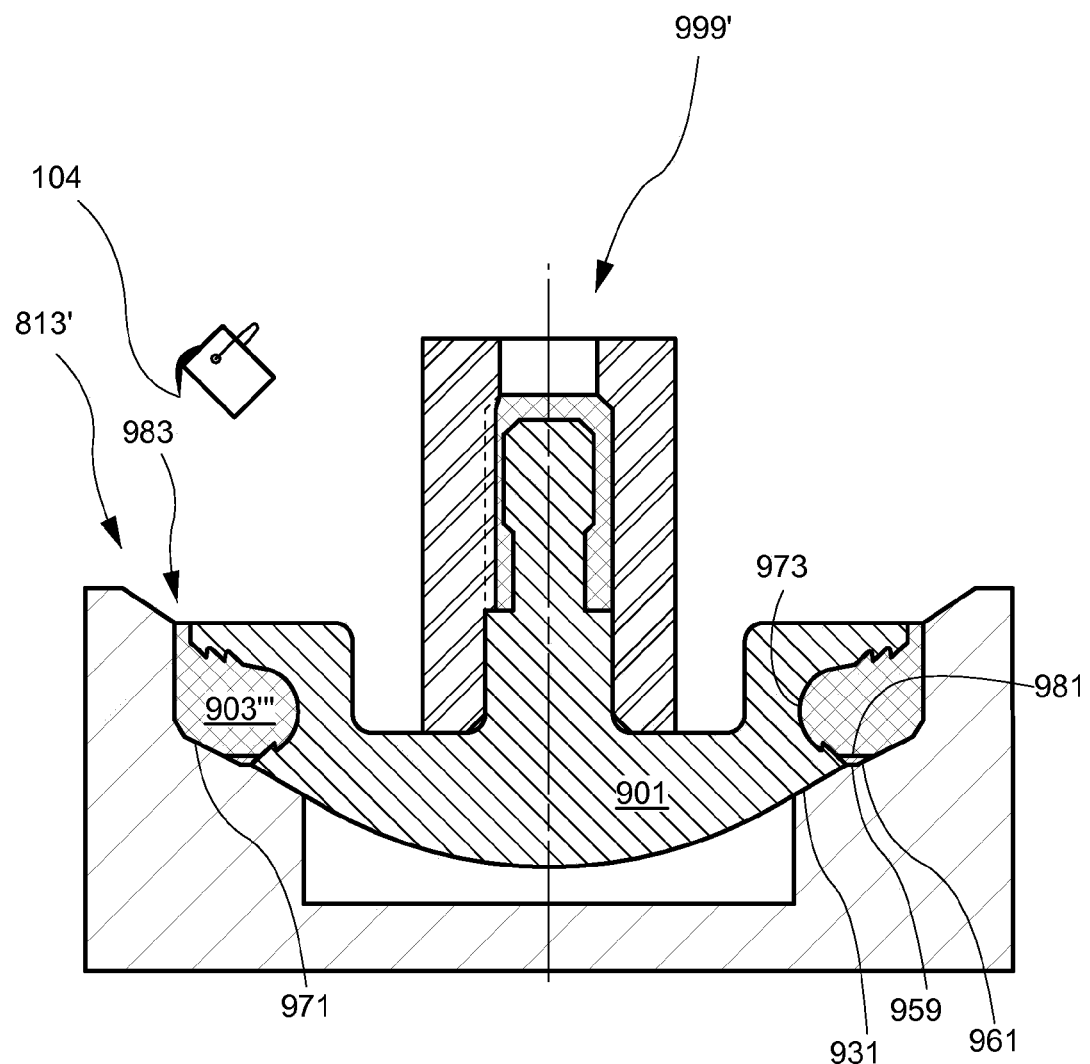
FIG. 16 schematically illustrates a partial cross-section of a valve body and seal assembly 999" analogous-in-part to that shown in FIG. 15 but showing casting of a second seal section in a seal retention groove.
Figure 17:
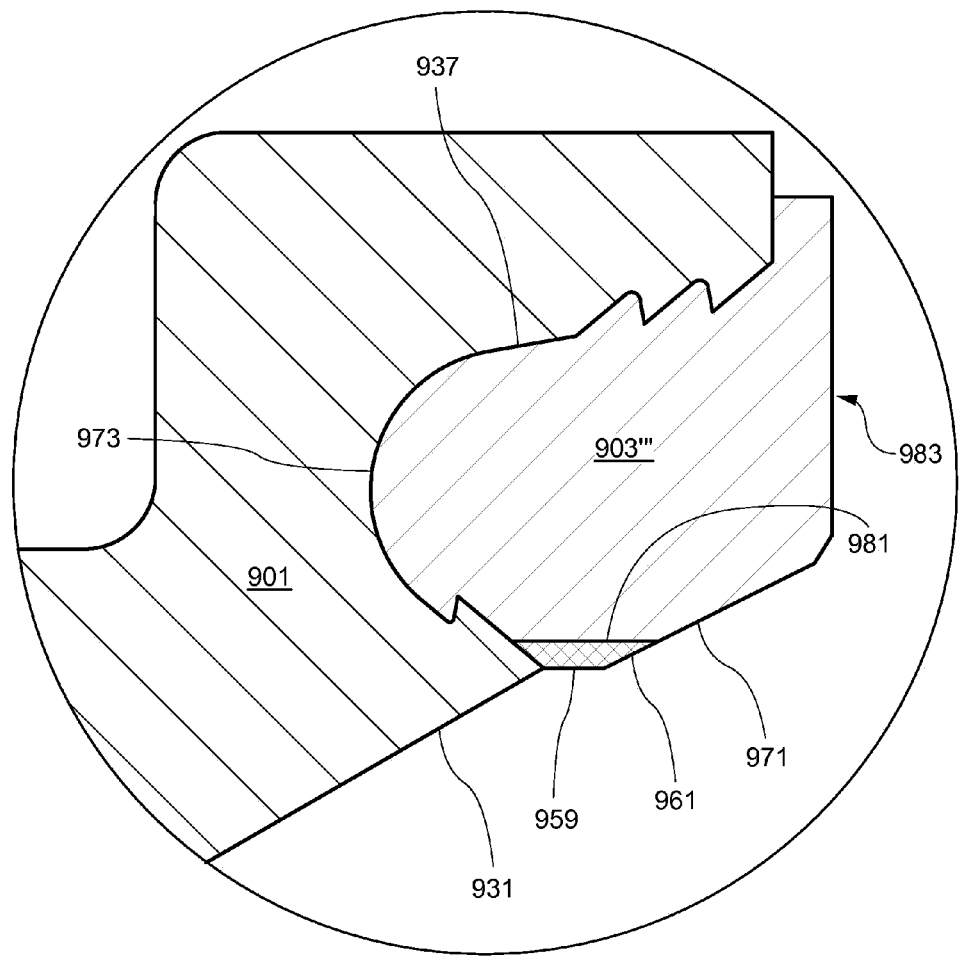
FIG. 17 schematically illustrates a magnified section analogous-in-part to that of FIG. 14F but showing an elastomeric seal comprising first and second seal sections cast in a seal retention groove.

FIGS. 15-17 schematically illustrate a method of making a valve body and seal assembly 999' comprising a valve body 901 and seal 983. The method comprises providing a mold 813' reversibly fitted as shown (see FIGS. 15 and 16) to a longitudinally symmetrical valve body 901. Valve body 901 comprises a seal retention groove 973 and a frusto-conical valve body impact area 931 for contacting a valve seat. The method further comprises symmetrically casting a first elastomer 103 in seal retention groove 973 to form a first seal section 959 of seal 983 having a first frusto-conical seal portion 961 for sealing against a valve seat (see FIG. 15). In connection with this casting step, frusto-conical valve body impact area 931 is central to and geometrically similar to first frusto-conical seal portion 961.

The method schematically illustrated in FIGS. 15-17 further comprises partially curing first elastomer 103 after it is cast in the shape of first seal section 959, followed by symmetrically casting a second elastomer 104 in seal retention groove 973 to form a second seal section 903''' of seal 983 having a second frusto-conical seal portion 971 for sealing against a valve seat (see FIG. 16). In connection with this casting step, first frusto-conical seal portion 961 is centrally adjacent to and geometrically similar to second frusto-conical seal portion 971. A final step includes crosslinking and curing first elastomer 103 (in the shape of first seal section 959) and second elastomer 104 (in the shape of second seal section 903''') in one or more areas where the seal sections are in contact (i.e., along intra-seal interface 981 as seen, e.g., in FIG. 17) to make a valve body and seal assembly 999'. Mold 813' may then be separated from valve body and seal assembly 999'.

Note that in the method schematically illustrated in FIGS. 15-17, first seal section 959 may comprise polyurethane of about 95 durometer Shore A hardness to about 60 durometer Shore D hardness to resist seal extrusion and/or to absorb and redistribute impact forces due to valve closure. And second seal section 903''' may comprise polyurethane of about 75 to about 85 durometer Shore A hardness to facilitate valve sealing on closure and to aid redistribution of impact forces due to valve closure. First seal section 959 may additionally comprise at least one lubricant (e.g., graphite and/or molybdenum disulfide) to reduce shear forces and seal extrusion on valve closure.

Lubricant elements 951, 955 and 957 can function to resist extrusion of elastomeric elements 903, 903' and 903" respectively when the lubricant elements have a higher modulus of elasticity than the respective elastomeric elements. These extrusion-resistance functions of partially embedded and crosslinked lubricant elements are not found in older valve designs. Rather, resistance to extrusion was provided in older valve designs by, for example, a bond between a cast-in-place elastomeric seal insert and a relatively rigid anti-extrusion ring and/or a seal retention groove wall. But such bonding resulted in high residual seal stress because the seal elastomer tended to shrink and pull away from the rigid ring and/or wall during curing. High residual seal stress, in turn, was associated with a corresponding increased tendency for the seal elastomer to crack and/or tear (see, e.g., the above discussion related to FIG. 3).

Since a lubricant element of the invention is relatively non-rigid and also crosslinked to an elastomeric element in which it is partially embedded, the lubricant element can be somewhat deformed by shrinkage of the embedding elastomer during curing. Such deformation of the lubricant element tends to reduce the harmful residual curing stresses that occurred previously when a cast-in-place elastomer was bonded to a rigid anti-extrusion ring or a seal retention groove wall. And with lowered residual curing stress in a peripheral valve seal, valve service life may be extended.

Further design considerations that may be applied to embodiments of the invention include the fact that first opposing groove walls on valve bodies of the invention are closer than second opposing walls to an area of high impact loads because they are closer to a peripheral metal sealing surface (i.e., an impact area) on the valve body. Thus, the periphery of first opposing groove walls is subject to relatively higher impact stress than other parts of the opposing groove walls when the metal of the valve body contacts the metal of the valve seat.

Second opposing groove walls, while more distant from the site of maximum metal-to-metal impact stress than first opposing walls, nevertheless experience significant bending stress due to forces transmitted to them through the seal insert elastomer. This bending stress on the second opposing groove wall is lowest peripherally and highest centrally (i.e., highest in that part of the wall that is closest to the longitudinal axis of the valve body). The area of maximum bending stress on second opposing groove walls is more central than the area of maximum metal-to-metal impact stress on first opposing walls because second opposing walls are effectively cantilevered peripherally from the most centrally located area of the seal retention groove.

Because the periphery of first opposing walls sustains relatively high impact stress, serrations on first opposing groove walls are preferably located as far centrally on such groove walls as practicable to maximize the distance from the impact area and thus minimize stress build-up near the serrations (which act as stress raisers). In a valve body having a longitudinal axis of symmetry, for example, this means that serrations on first opposing walls are located as close as practicable to the longitudinal axis of symmetry (i.e., relatively centrally in the seal retention groove). This relatively central location also provides clearance between the serrations and a frustoconical lubricant element such as 951, which may be located more peripherally (i.e., proximate to the first opposing groove wall and the impact area of a valve body). On the other hand, serrations on second opposing walls are located as far as practicable from the longitudinal axis of symmetry (i.e., peripherally, relative to the centrally-placed serrations on the first opposing walls as noted above).

Serrations on first and second groove walls are thus offset. Serration offset, in turn, minimizes the detrimental stress-raising effects of the serrations on their respective valve body flange areas. Additionally, use of offset serrations means that retaining forces exerted on an elastomeric seal in a groove by serrations on the opposing groove walls are further spaced apart as a function of the offset distance. This further spacing apart adds to the separation of forces acting on the seal insert and thus tends to allow limited relative movement of the seal insert with respect to the groove walls without excessive elastomer stress.

Thus, the offset serrations in a seal retention groove of the invention act to reduce the likelihood of fatigue failures in valve body flanges, and they simultaneously reduce stress concentration in the elastomer of a seal in the groove. The latter benefit may be further increased if spacing between the respective flange areas that form the opposing walls of a seal retention groove increases as a function of increasing distance from the valve body longitudinal axis. Spacing between seal retention groove walls is determined in part by industry standards but may diverge peripherally in valve bodies of the invention to obtain additional elastomer stress relief.

Elastomer stress may also be reduced when provision is made for escape of air or gas bubbles that may be present during casting of an elastomeric seal insert and/or an elastomeric guide stem sleeve in a mold comprising portions of a valve body when the longitudinal axis of the valve body is in the vertical orientation. For casting of a guide stem sleeve, escape of the air bubbles is facilitated by the presence of a superior chamfered wall on any guide stem undercut that may be present. For casting of a seal insert in a seal retention groove, escape of the air bubbles is facilitated if the groove width increases as a function of increasing distance from the valve body longitudinal axis. A desirable amount of groove width increase with increasing distance from the valve body longitudinal axis may be specified in terms of the included angle measured between straight (or nearly straight) portions of seal retention groove walls. The preferred range of these included angles for the invention is about 10 to 60 degrees, depending on the particular valve body design.

Note that curvature of groove walls toward the center of the groove is allowable if the resulting curved wall would not trap air bubbles in castable elastomer when the valve body is in position for casting of a seal in the groove. Included angle measurements for any curved portion of the groove wall may be made using the chord of any such curved portion.

What is claimed is:

1. A valve body having a longitudinal axis of symmetry, the valve body comprising:
    a peripheral seal retention groove positioned around the valve body and spaced apart from the longitudinal axis of symmetry, the seal retention groove defining a seal receiving portion of the valve body that is operable to receive at least one elastomeric seal, the peripheral seal retention groove including:
        a first wall portion extending peripherally around the valve body and having at least one serration extending peripherally around the valve body,
        a second wall portion at least partially facing the first wall portion and extending peripherally around the valve body and having at least one serration extending peripherally around the valve body, and
        a curvilinear portion positioned between the first wall portion and the second wall portion to form a closed portion of the peripheral seal retention groove, the closed portion positioned opposite an open portion of the peripheral seal retention groove defined as the area between an outer end of the first wall portion and an outer end of the second wall portion;

a valve seat contact portion positioned adjacent the peripheral seal retention groove closest the second wall portion, the valve seat contact portion operable to contact a corresponding portion of a valve seat to assist with the closure between the valve body and the valve seat; and a top portion positioned a distance from the peripheral seal retention groove closest the first wall portion;

wherein the at least one serration of the first wall portion and the second wall portion includes a tip that is generally directed toward the closed end.

2. The valve body according to claim 1, wherein the valve seat contact portion is frusto-conical in shape.

3. The valve body of claim 1, wherein the first wall portion extends from the closed portion to the open portion of the peripheral seal retention groove, the second wall portion extends from the closed portion to the open portion of the peripheral seal retention groove, and wherein the outer end of the first wall portion is positioned further from the longitudinal axis of symmetry than the outer end of the second wall portion.

4. The valve body according to claim 3, wherein the first wall portion and the second wall portion are not generally parallel with respect to one another.

5. The valve body according to claim 1, wherein the first wall portion extends from the closed portion to the open portion of the peripheral seal retention groove, the second wall portion extends from the closed portion to the open portion of the peripheral seal retention groove, and the first wall portion and the second wall portion are positioned generally at an angle relative to one another such that the open portion is wider than the closed portion.

6. The valve body according to claim 1, wherein the first wall portion extends from the closed portion to the open portion of the peripheral seal retention groove, the second wall portion extends from the closed portion to the open portion of the peripheral seal retention groove, and the first wall portion and the second wall portion are positioned generally at an angle relative to one another such that the closed portion is narrower than the open portion.

7. The valve body according to claim 1, wherein the at least one serration of the first wall portion includes at least two serrations.

8. The valve body according to claim 1, wherein the at least one serration of the second wall portion includes at least two serrations.

9. The valve body according to claim 1, wherein one of the first wall portion and the second wall portion of the peripheral seal retention groove includes at least one additional serration than the other wall portion.

10. The valve body according to claim 1, wherein the at least one serration of the first wall portion includes a tip that is generally directed toward the second wall portion.

11. The valve body according to claim 1, wherein the at least one serration of the second wall portion includes a tip that is generally directed toward the first wall portion.

12. The valve body according to claim 1, wherein the peripheral seal retention groove is operable to receive at least one elastomeric material that extends beyond the open portion of the peripheral seal retention groove.

13. The valve body according to claim 12, wherein the at least one elastomeric material that extends beyond the open portion of the peripheral seal and adjacent the top portion.

14. The valve body according to claim 1, wherein the peripheral seal retention groove is operable to receive at least two elastomeric materials that extends beyond the open portion of the peripheral seal retention groove.

15. The valve body according to claim 1, wherein the at least one serration of the first wall portion and the at least one serration of the second wall portion are not positioned directly across from one another in the peripheral seal retention groove.

16. A valve body and seal assembly having a longitudinal axis of symmetry, the assembly comprising:

a peripheral seal retention groove positioned around the assembly and spaced apart from the longitudinal axis of symmetry, the seal retention groove defining a seal receiving portion of the assembly that is operable to receive at least one elastomeric seal, the peripheral seal retention groove including:

a first wall portion extending peripherally around the assembly and having at least one serration extending peripherally around the assembly, a second wall portion at least partially facing the first wall portion and extending peripherally around the assembly and having at least one serration extending peripherally around the assembly, and a curvilinear portion positioned between the first wall portion and the second wall portion to form a closed portion of the peripheral seal retention groove, the closed portion positioned opposite an open portion of the peripheral seal retention groove defined as the area between an outer end of the first wall portion and an outer end of the second wall portion;

a valve seat contact portion positioned adjacent the peripheral seal retention groove closest the second wall portion, the valve seat contact portion operable to contact a corresponding portion of a valve seat to assist with the closure between the assembly and the valve seat;

a top portion positioned a distance from the peripheral seal retention groove closest the first wall portion; and an elastomeric seal positioned at least partially in the seal receiving portion of the peripheral seal retention groove and extending through the open portion of the peripheral seal retention groove;

wherein the at least one serration of the first wall portion and the second wall portion includes a tip that is generally directed toward the closed end of the peripheral seal retention groove.

17. The assembly according to claim 16, wherein the valve seat contact portion is frusto-conical in shape, and wherein a portion of the elastomeric seal that extends through the open portion of the peripheral seal retention groove is frusto-conical in shape, adjacent the valve seat contact portion, and operable to contact a corresponding portion of the valve seat to assist with the closure between the assembly and the valve seat.

18. The assembly according to claim 16, wherein the elastomeric seal that extends beyond the open portion of the peripheral seal extends adjacent the top portion.

* * * * *